(12) United States Patent
Njoroge

(10) Patent No.: US 11,947,875 B1
(45) Date of Patent: *Apr. 2, 2024

(54) APPARATUS AND METHOD FOR MAINTAINING AN EVENT LISTING USING VOICE CONTROL

(71) Applicant: Actriv Healthcare Inc., Tacoma, WA (US)

(72) Inventor: Allan Njoroge, Tacoma, WA (US)

(73) Assignee: Actriv Healthcare Inc., Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,592

(22) Filed: Sep. 13, 2023

(51) Int. Cl.
  G06F 3/0482 (2013.01)
  G06F 3/04845 (2022.01)
  G06F 3/16 (2006.01)
  G10L 15/00 (2013.01)

(52) U.S. Cl.
  CPC ............ G06F 3/167 (2013.01); G06F 3/0482 (2013.01); G06F 3/04845 (2013.01); G10L 15/00 (2013.01)

(58) Field of Classification Search
  CPC .... G06F 3/167; G06F 3/0482; G06F 3/04845; G10L 15/00
  See application file for complete search history.

(56) References Cited

U.S. PATENT DOCUMENTS

| | | | | |
|---|---|---|---|---|
| 9,786,281 B1 * | 10/2017 | Adams | ..................... | G10L 15/26 |
| 10,861,455 B2 | 12/2020 | Cohen | | |
| 11,100,922 B1 * | 8/2021 | Mutagi | ................... | G06F 3/167 |
| 11,282,523 B2 * | 3/2022 | Gross | ..................... | G10L 15/22 |
| 2014/0358553 A1 * | 12/2014 | Helmke | .................. | G10L 15/22 |
| | | | | 704/275 |
| 2021/0319791 A1 * | 10/2021 | Cho | ........................ | G10L 15/22 |
| 2022/0270604 A1 * | 8/2022 | Lee | ......................... | G06F 40/30 |
| 2023/0113524 A1 * | 4/2023 | Kannan | ................... | G06F 3/167 |
| | | | | 704/275 |
| 2023/0136309 A1 * | 5/2023 | Xiao-Devins | ........ | G06F 40/295 |
| | | | | 705/7.13 |
| 2023/0290348 A1 * | 9/2023 | Rodriguez Bravo | ... | G10L 15/22 |
| | | | | 704/275 |

FOREIGN PATENT DOCUMENTS

| | | |
|---|---|---|
| CN | 112415908 A | 2/2021 |
| EP | 1511277 A1 | 3/2005 |

\* cited by examiner

*Primary Examiner* — Anil K Bhargava

(74) *Attorney, Agent, or Firm* — Caldwell Intellectual Property Law

(57) ABSTRACT

An apparatus for maintaining an event listing using voice control, the apparatus includes a sound capturing device configured to capture acoustic data and a computing device connected to the sound device configured to receive the acoustic data, identify a voice input based on the acoustic data using a voice recognition module, wherein the voice recognition module is configured to identify a target entity and identify event activation data, obtain entity data associated with the target entity containing historical event data, generate a voice-activated command using the voice input via a command interpretation module, wherein the command interpretation module is configured to determine a maintenance operation for an event related to the target entity as a function of event activation data and the historical event data, maintain an event listing using the voice-activated command by executing the at least a maintenance operation, and display the event listing using a user interface.

18 Claims, 9 Drawing Sheets

APPARATUS AND METHOD FOR MAINTAINING AN EVENT LISTING USING VOICE CONTROL

FIELD OF THE INVENTION

The present invention generally relates to the field of digital audio data processing. In particular, the present invention is directed to an apparatus and method for maintaining an event listing using voice control.

BACKGROUND

Managing event listings such as employee shifts and schedules is a complex task that requires careful planning and efficient communication. Traditionally, this task has been handled manually, often using time-consuming and error-prone methods like spreadsheets or paper schedules. Such manual process often leads to mistakes, such as double-booked events or scheduling conflicts, which can negatively impact both operational efficiency and employee satisfaction. Moreover, existing solutions do not offer a satisfactory level of simplicity, speed, or flexibility. They often require significant time and effort to create, update, and manage event listings, and they do not provide sufficient options for customizing event listings based on various variables.

SUMMARY OF THE DISCLOSURE

In an aspect, an apparatus for maintaining an event listing using voice control is described. The apparatus includes a sound capturing device configured to capture acoustic data from a surrounding environment and a computing device communicatively connected to the sound device, wherein the computing device is configured to receive the acoustic data from the sound capturing device, identify a voice input as a function of the acoustic data using a voice recognition module, wherein the voice recognition module is configured to identify at least a target entity from a plurality of entities, and identify event activation data from the voice input, obtain entity data associated with the at least a target entity, wherein the entity data includes historical event data, generate a voice-activated command as a function of the voice input using a command interpretation module, wherein the command interpretation module is configured to determine at least a maintenance operation for at least an event related to the at least a target entity as a function of event activation data and the historical event data, maintain an event listing containing a plurality of events associated with the plurality of entities in real time as a function of the voice-activated command by executing the at least a maintenance operation on the event listing, and display the event listing using a user interface.

In another aspect, a method for maintaining an event listing using voice control is described. The method includes capturing, using a sound capturing device, acoustic data from a surrounding environment, receiving, using a computing device, the acoustic data from the sound capturing device, identifying, using the computing device, a voice input as a function of the acoustic data via a voice recognition module, wherein the voice recognition module is configured to identify at least a target entity from a plurality of entities and identify event activation data from the voice input, obtaining, using the computing device, entity data associated with the at least a target entity, wherein the entity data includes historical event data, generating, using the computing device, a voice-activated command as a function of the voice input via a command interpretation module, wherein the command interpretation module is configured to determine at least a maintenance operation for at least an event related to the at least a target entity as a function of event activation data and the historical event data, maintaining, using the computing device, an event listing comprising a plurality of events associated with the plurality of entities in real time as a function of the voice-activated command by executing the at least a maintenance operation on the event listing, and displaying, using a user interface, the event listing.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for maintaining an event listing using voice control, the apparatus includes a sound capturing device configured to capture acoustic data from a surrounding environment and a computing device communicatively connected to the sound device, wherein the computing device is configured to receive the acoustic data from the sound capturing device, identify a voice input as a function of the acoustic data using a voice recognition module, wherein the voice recognition module is configured to identify at least a target entity from a plurality of entities, and identify event activation data from the voice input, obtain entity data associated with the at least a target entity, wherein the entity data includes historical event data, generate a voice-activated command as a function of the voice input using a command interpretation module, wherein the command interpretation module is configured to determine at least a maintenance operation for at least an event related to the at least a target entity as a function of event activation data and the historical event data, maintain an event listing containing a plurality of events associated with the plurality of entities in real time as a function of the voice-activated command by executing the at least a maintenance operation on the event listing, and display the event listing using a user interface. Exemplary embodiments illustrating aspects of the present disclosure are described below in the context of several specific examples.

Figure 1:
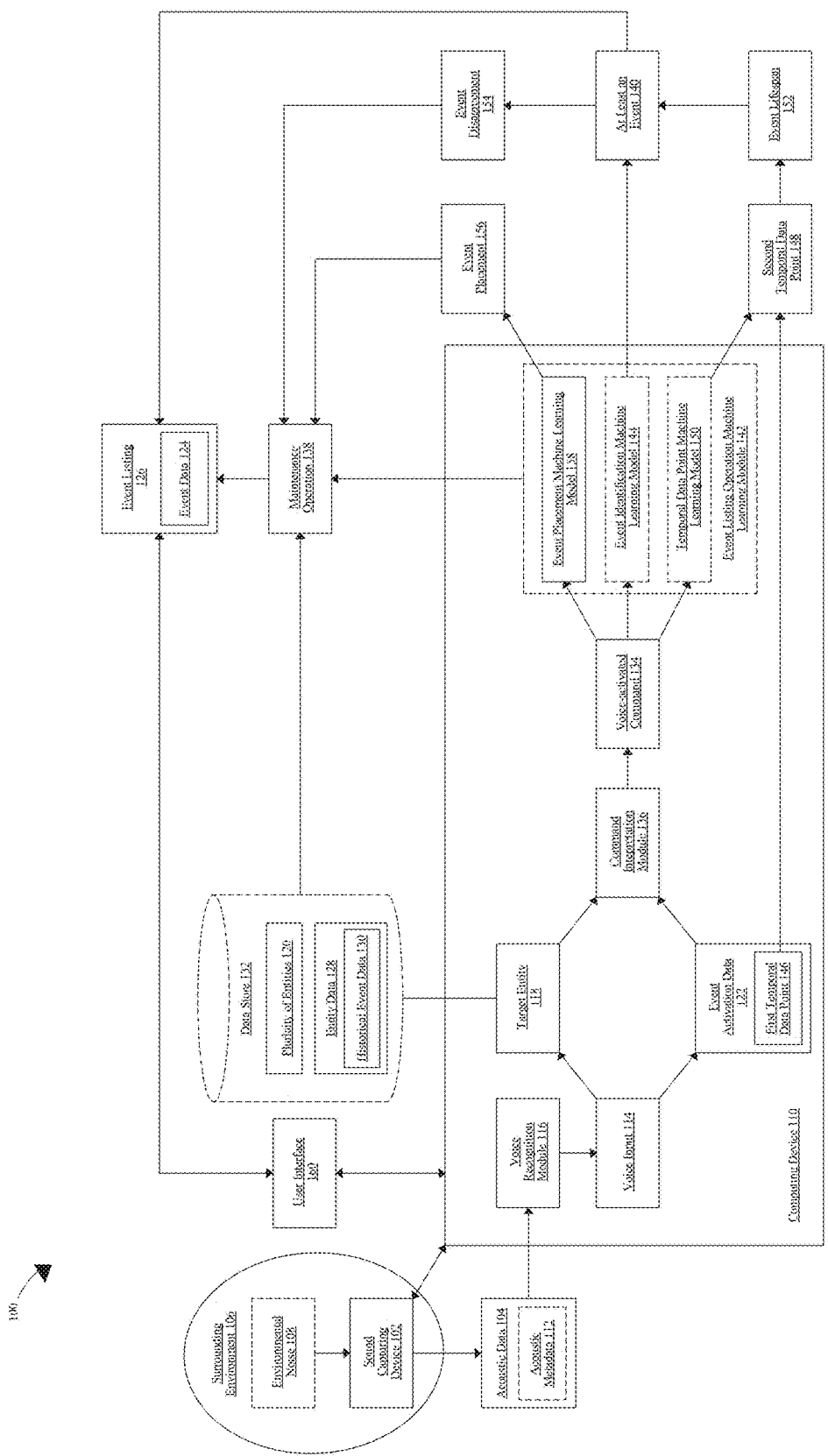
FIG. 1 is a block diagram of an exemplary apparatus for maintaining an event listing using voice control.

Referring now to FIG. 1, an exemplary embodiment of an apparatus 100 for maintaining an event listing using voice control is illustrated. As used in this disclosure, "voice control" is a technology that allows users of apparatus 100 to interact with one or more devices, computer systems, or digital assistants using spoken language. In an embodiment, voice control may include a voice-user interface (VUI) configured to make spoken human interaction with one or more computing devices using speech recognition to understand spoken commands, for example, and without limitation, answer questions, play media, virtual assistant interaction, smart home control, voice search, navigation and directions, transcription, and the like. Exemplary embodiments of voice control consistent with present disclosure are described in further detail below.

Still referring to FIG. 1, a "user," for the purpose of this disclosure, refers to any individual who interacts with apparatus 100. In an embodiment, user may include one or more individuals who acoustically issue commands to or receive information from apparatus 100. In a non-limiting example, user may include, without limitation, managers, supervisors, human resources (HR) staffs, administrative staffs, any other employees, and/or the like. In other non-limiting examples, user may include employers who regularly or occasionally monitor on employees (i.e., other users). In some cases, "user" may be used interchangeably with "entity," as described in further detail below.

With continued reference to FIG. 1, apparatus 100 includes a sound capturing device 102. As used in this disclosure, a "sound capturing device" refers to any device or component that is capable of picking up an audio signal from an environment and converting the audio signal into another signal such as an electrical signal that can be processed by other device or component within apparatus 100. In an embodiment, sound capturing device may include a diaphragm (i.e., a thin piece of material that vibrates when it comes into contact with sound waves (i.e., audio signal), a transducer element attached to the diaphragm configured to converts a mechanical energy of the vibrating diaphragm into an electrical signal, and one or more output electronics configured to prepares the signal to be sent to the next stage of signal processing as described below in this disclosure. In some cases, output electronics may include, without limitation, transformer, impedance matching circuits, analog-to-digital converter (ADC), and/or the like.

Still referring to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be used to communicate between two or more devices, including without limitation computing devices. In some cases, a digital signal may be communicated by way of one or more communication protocols, including without limitation internet protocol (IP), controller area network (CAN) protocols may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital, serial communication protocols (e.g., universal asynchronous receiver-transmitter [UART]), parallel communication protocols (e.g., IEEE 128 [printer port]), and the like.

Still referring to FIG. 1, an "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively, or additionally, audio signal may include a digital signal of time-varying digital numbers. In some cases, a digital audio signal may be communicated (e.g., transmitted and/or received) by way of any of an optical fiber, at least an electrically transmissive path, and the like. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Audio signals may represent frequencies within an audible range corresponding to ordinary limits of human hearing, for example substantially between about 20 and about 20,000 Hz. According to some embodiments, an audio signal may include one or more parameters, such as without limitation bandwidth, nominal level, power level (e.g., in decibels), and potential level (e.g., in volts). In some cases, relationship between power and potential for an audio signal may be related to an impedance of a signal path of the audio signal. In some cases, a signal path may single-ended or balanced.

In a non-limiting example, and still referring to FIG. 1, sound capturing device 102 may include a microphone. As used in this disclosure, a "microphone" is any transducer configured to transduce pressure change phenomenon to a signal, for instance a signal representative of a parameter associated with the phenomenon. Microphone, according to some embodiments, may include a transducer configured to convert sound into electrical signal. Exemplary non-limiting microphones include dynamic microphones (which may include a coil of wire suspended in a magnetic field), condenser microphones (which may include a vibrating diaphragm condensing plate), and a contact (or conductance) microphone (which may include piezoelectric crystal material). Microphone may include any microphone for transducing pressure changes, as described above; therefore, microphone may include any variety of microphone, including any of condenser microphones, electret microphones, dynamic microphones, ribbon microphones, carbon microphones, piezoelectric microphones, fiber-optic microphones, laser microphones, liquid microphones, microelectromechanical systems (MEMS) microphones, and/or a speaker microphone.

With continued reference to FIG. 1, sound capturing device 102 is configured to capture acoustic data 104 from a surrounding environment 106. As used in this disclosure, "acoustic data" refers to information that represents sound waves. In an embodiment, acoustic data 104 may be a time series of measurements that describe characteristics of sound wave that hits sound capturing device 102 at each point in time. In some cases, acoustic data 104 may include information related to user produced sounds (i.e., sounds that are created or generated by one or more users). In some cases, sounds may be intentionally created or generated; for instance, and without limitation, acoustic data 104 may include digital representation of one or more user's spoken commands, wherein the user's spoken commands may include everything from simple one-word command (e.g., "start," "stop," "play," "pause," among others) to more complex sentences (e.g., "Set up an alarm for tomorrow morning at 7 AM."). In other cases, sounds may be unintentionally created or generated; for instance, and without limitation, movement sounds (i.e., sounds produced by user's physical movement e.g., footsteps, rustling of clothing, handling objects, and/or the like), vocalizations and involuntary sounds (e.g., sighs, yawns, groans, any other sound that are not intentionally produced for communication purposes), background noise and environmental sounds, among others.

In one or more embodiments, and still referring to FIG. 1, acoustic data may include a data element representing a frequency (typically measured in Hz) of a sound, wherein the frequency measures a number of times a sound wave cycles per unit of time (e.g., second). Frequency may be used to determine a pitch of the sound (i.e., how high or low the sound is perceived); for instance, and without limitation, a higher frequency may correspond to a higher pitch while a lower frequency may correspond to a lower pitch.

In one or more embodiments, and still referring to FIG. 1, acoustic data 104 may include a data element representing an amplitude of a sound, wherein the amplitude measures a size of one or more fluctuations in fluid pressure caused by the sound wave. Amplitude may be used to determine the volume or loudness of the sound. In a non-limiting example, when captured by sound capturing device 102 e.g., microphone, variations of air pressure may be captured, and converted into voltage variations, wherein the voltage variations may then be digitized.

In one or more embodiments, and still referring to FIG. 1, acoustic data 104 may include one or more data elements representing one or more phases of a sound wave of a sound, wherein phases describe where in its cycle the sound wave of the sound at a given point in time. In should be noted that when dealing with multiple audio signals or channels, as relative phase of a plurality of different sound waves may affect how the plurality of different sound waves combine and/or processed.

In one or more embodiments, and still referring to FIG. 1, acoustic data 104 may include one or more data elements representing one or more harmonics of a sound, wherein harmonics are additional frequencies that are produced alongside the fundamental frequency of the sound. In some cases, most sounds, including human speech, may include complex sounds consisting of multiple frequencies. In a non-limiting example, fundamental frequency (i.e., the pitch sound capturing device 102 may perceive the sound to have) may be the lowest. Harmonics may include multiples of fundamental frequency and contribute to the timbre of the sound, which makes the sound unique.

In one or more embodiments, and still referring to FIG. 1, acoustic data 104 may include a spectrogram, wherein the spectrogram is a visual representation of the spectrum of frequencies in a sound or other signal as they vary with time. In some cases, spectrograms may be used in further processing steps as described below as they may provide a detailed view of different frequencies that make up sound over time.

With continued reference to FIG. 1, in some cases, acoustic data 104 may be transformed by apparatus 100 into a form that is more conducive to analysis. In a non-limiting example, apparatus 100 may be configured to perform one or more signal processing steps on a signal. For instance, system 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, as used in this disclosure, a "surrounding environment" refers to a space in which sound capturing device 102 is operating and from which it is capturing sound. In an embodiment, surrounding environment 106 may include any physical location where sound is present. In a non-limiting example, apparatus 100 may include a user device. A "user device," for the purpose of this disclosure, is any additional computing device used by user to access and/or interact with processor 102, such as a mobile device, laptop, desktop computer, or the like.

Sound capturing device 102 may include a microphone in a smartphone, wherein the surrounding environment may include user's home, workplace, street, public transportation, or any other place where user might carry the smartphone. In some cases, sound capturing device 102 may capture not just the sound of the user's voice, but also background noise from surrounding environment 106; for instance, and without limitation, acoustic data 104 may include an environmental noise 108, wherein sound capturing device 102 may be configured to transduce the environmental noise 108 to an environmental noise signal. In some cases, environmental noise may include any of background noise, ambient noise, aural noise, such as noise heard by a user's ear, and the like. Additionally, or alternatively, in some embodiments, environmental noise 108 may include any noise present in surrounding environment 106. In a non-limiting example, environmental noise 108 may include substantially continuous noises such traffic noises including sound of engines, tires, horns, and/or the like, industrial machinery noise such as continuous hum, whir, or rumble produced by large machinery, air conditioner noise, background chatter, wind noise, and/or the like. Alternatively, or additionally, in some cases, environmental noise 108 may include substantially non-continuous noises. In a non-limiting example, substantially non-continuous noises may include such as siren, gunshot, doorbell, explosion, thunder, firework, alarm, and/or the like. Environmental noise signal may include any type of signal described in this disclosure; for instance, and without limitation, environmental noise signal may include a digital signal or an analog signal.

With continued reference to FIG. 1, apparatus 100 includes a computing device 110 communicatively connected to sound capturing device 102. Computing device 110 may include at least a processor. Processor may include, without limitation, a microcontroller, microprocessor, digital signal processor (DSP) and/or system on a chip (SoC) as described in this disclosure. Computing device 110 may include, be included in, and/or communicate with a mobile device such as a mobile telephone or smartphone. Computing device 110 may include a single computing device operating independently, or may include two or more computing device operating in concert, in parallel, sequentially or the like; two or more computing devices may be included together in a single computing device or in two or more computing devices. Computing device 110 may interface or communicate with one or more additional devices as described below in further detail via a network interface device. Network interface device may be utilized for connecting Computing device 110 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 110 may include but is not limited to, for example, a computing device or cluster of computing devices in a first location and a second computing device or cluster of computing devices in a second location. Computing device 110 may include one or more computing devices dedicated to data storage, security, distribution of traffic for load balancing, and the like. Computing device 110 may distribute one or more computing tasks as described below across a plurality of computing devices of computing device, which may operate in parallel, in series, redundantly, or in any other manner used for distribution of tasks or memory between computing devices. Computing device 110 may be implemented using a "shared nothing" architecture in which data is cached at the worker, in an embodiment, this may enable scalability of apparatus 100 and/or computing device.

With continued reference to FIG. 1, Computing device 110 may be designed and/or configured to perform any method, method step, or sequence of method steps in any embodiment described in this disclosure, in any order and with any degree of repetition. For instance, Computing device 110 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 110 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

In an embodiment, and still referring to FIG. 1, apparatus 100 and/or computing device 110 described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, apparatus 100 and/or computing device 110 described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, and still referring to FIG. 1, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Still referring to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 1, Zero-knowledge proof may include any other suitable zero-knowledge proof. Zero-knowledge proof may include, without limitation, bullet-proofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, and still referring to FIG. 1, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, apparatus 100 and/or computing device 110 may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, computing device 110 is configured to receive the acoustic data 104 from sound capturing device 102. In an embodiment, sound capturing device 102 may be configured to continuously transmit acoustic data 104 through one or more output electronics as described above in real time. In some cases, transmission of acoustic data 104 may be accomplished via a wireless connection; for instance, and without limitation, apparatus 100 may include a wireless setup, wherein sound capturing device 102 may transmit acoustic data 104 to computing device 110 through wireless technology such as Bluetooth or Wi-Fi. In some cases, transmission of acoustic data 104 may be accomplished via a wired connection; for instance, and without limitation, apparatus 100 may include a wired setup, wherein sound capturing device 102 may be directly connected to computing device 110 through a physical cable such as auxiliary cable, XLR cable, USB cable and/or the like. In other cases, apparatus 100 may include an integrated system, wherein sound capturing device 102 and computing device 110 may be part of a same physical unit; for instance, and without limitation, acoustic data 104 may be directly captured, received, and processed by the device's internal hardware. Additionally, or alternatively, acoustic data 104 may be received from a chatbot operating on or communicating with computing device 110. For the purposes of this disclosure, "chatbot" is an artificial intelligence (AI) program designed to simulate human conversation or interaction through text or voice-based communication. In a non-limiting example, chatbots may be programmed to query user to receive acoustic data 104 containing one or more user responses. Chatbot disclosed herein is further described with reference to FIG. 3.

With continued reference to FIG. 1, in some cases, receiving acoustic data 104 may include receiving acoustic metadata 112. As used in this disclosure, "acoustic metadata" refers to additional information that accompanies acoustic data 104. In some cases, acoustic metadata 112 may include descriptive details of captured acoustic data 104 that provide context or additional details about acoustic data 104. In a non-limiting example, without limitation, acoustic metadata 112 may include time data, e.g., date and time when acoustic data 104 was captured by sound capturing device 102. In another non-limiting example, without limitation, acoustic metadata 112 may include device information. In some cases, apparatus 100 may include a plurality of microphones. Acoustic metadata 112 may include information of what type of microphone was used to captured acoustic data 104 e.g., device identifier (ID), manufacturer and model, firmware version, device settings, connectivity, and/or the like. In a further non-limiting example, acoustic metadata 112 may include data related to environmental conditions. In some cases, acoustic metadata 112 may include information related to conditions in surrounding environment 106 during acoustic data 104 capture; for instance, and without limitation, acoustic metadata 112 may include level of ambient noise, acoustics of the room, among others. Other exemplary acoustic metadata 112 may include, without limitation, file format, annotation, duration, sample rate, bit depth, and any other relevant attributes. In some cases, acoustic metadata 112 may be used to organize, categorize, and understand, by computing device 110 and/or one or more machine learning models described herein, the content of acoustic data 104.

With continued reference to FIG. 1, computing device 110 is configured to identify a voice input 114 as a function of acoustic data 104 using a voice recognition module 116. As used in this disclosure, a voice input 114. As used in this disclosure, a "voice input" refers to a spoken command or information provided by user to apparatus 100 having computing device 110 equipped to process and respond to the spoken command. In a non-limiting example, when user intentionally speaks into sound capturing device 102, such as a microphone, user's speech may create a plurality of sound waves which may then be captured by sound capturing device 102. Such raw audio data, i.e., acoustic data 104 may then be converted into a digital signal that may be processed and analyzed by computing device 110 using voice recognition module 116. In some cases, voice input 114 may be text-based; for instance, and without limitation, voice input 114 may include a text transcription of user's speech that can be understood by computing device 110.

Still referring to FIG. 1, voice input 114 may include various form of input. In some cases, voice input 114 from user may include one or more command inputs, for example, and without limitation, user may say "Open calendar," "Go to next month," or "Schedule a seven days of vacation in the last week of next month." In some cases, voice input 114 from user may include one or more query inputs, for example, and without limitation, "What's the schedule next week?" or "When is my next workday?" In some cases, voice input 114 from user may include one or more dictation inputs. In a non-limiting example, voice input 114 may include information to be recorded, by computing device 110, such as composing emails, writing notes, or inputting text into a documentation or a form. In other cases, voice input 114 from user may include one or more conversational interactions; for instance, and without limitation, voice input 114 may include multiple turns of conversation, with user and apparatus 100 going back and forth.

Still referring to FIG. 1, as used in this disclosure, a "voice recognition module" is a component or a piece of software that is configured to identify spoken language. In an embodiment, voice recognition module 116 may be configured to convert spoken words into readable text via an automatic speech recognition. Automatic speech recognition may require training (i.e., enrollment). In some cases, training an automatic speech recognition model may require an individual speaker to read text or isolated vocabulary. In some cases, acoustic data 104 may include an audible verbal content, the contents of which are known a priori by computing device 110. Computing device 110 may then train an automatic speech recognition model according to training data which includes audible verbal content correlated to known content. In this way, computing device 110 may analyze a user's specific voice and train an automatic speech recognition model to the user's speech, resulting in increased accuracy. Alternatively, or additionally, in some cases, voice recognition module 116 may be speaker independent. As used in this disclosure, a "speaker independent" voice recognition module 116 does not require training for each individual speaker. Conversely, as used in this disclosure, voice recognition module 116 that employ individual speaker specific training are "speaker dependent."

Still referring to FIG. 1, in some embodiments, voice recognition module 116 may perform voice recognition or speaker identification. As used in this disclosure, "voice recognition" refers to identifying a speaker, from audio content, rather than what the speaker is saying. In some cases, computing device 110 may first recognize a speaker of verbal audio content and then automatically recognize speech of the speaker, for example by way of a speaker dependent automatic speech recognition model or process. In some embodiments, voice recognition module 116 can be used to authenticate or verify an identity of a speaker. In some cases, a speaker may or may not include a subject. For example, a subject may speak within environmental noise 108, e.g., in a media played in surrounding environment 106, but others may speak as well.

Still referring to FIG. 1, computing device 110 is configured voice recognition module 116 to identify at least a target entity 118 from a plurality of entities 120. A "entity," for the purpose of this disclosure, refers to a meaningful unit that is identified and extracted from acoustic data 104 and/or voice input 114. As used in this disclosure, a "target entity" is a specific element or object that is the intended recipient or subject of data (e.g., voice-activated command as described in further detail below). In some cases, at least a target entity 118 may include one or more users. In a non-limiting example, voice recognition module 116 may not only recognize speech content, but also recognize the identity of the speaker (i.e., target entity 118). Voice recognition module 116 may be configured to extract voice features from voice input 114, compare the extracted voice features to a plurality of voiceprints associated with plurality of entities 120 (i.e., plurality of users), and identity at least a target entity 118 from plurality of entities 120 as a function of the comparison. In some cases, each user may be associated with one or more voiceprints, wherein each "voiceprint," as described herein, is a digital representation of a set of unique characteristics/features of a user's voice.

Still referring to FIG. 1, apparatus 100 may acquire a sample of the speaker's voice to create voiceprints. In a non-limiting example, computing device 110 may be configured to create one or more voiceprints using sound capturing device 102 through one or more enrollment process as described above. User may be asked to speak one or more phrases or sentences (i.e., acoustic data 104), which computing device 110 may be configured to analyze acoustic data 104 and capture a plurality of unique vocal traits such as, without limitation, pitch, tone, rhythm, any other voice characteristics. Such plurality of unique vocal traits may then be stored in voiceprint that represents unique qualities of user's voice. In some cases, voiceprints may be stored in a data store such as, without limitation, a database as described in further detail below. Identifying at least a target entity 118 from plurality of entities 120 may include selecting at least one stored voiceprint with a highest degree of similarity that exceed a predetermined threshold and identify the speaker as a function of the at least one voiceprint. In some cases, degree of similarity may be calculated, by computing device 120, through various methods such as, without limitation, Euclidean distance, dynamic time warping (DTW), cosine similarity, among others, Conversely, if no match is found by computing device 110 (i.e., degrees of similarity of plurality of voiceprints are lower than the predetermined threshold), apparatus 100 may not be able to identity the speaker.

With continued reference to FIG. 1, in some embodiments, apparatus 100 may include a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared.

Still referring to FIG. 1, at least a target entity 118 may be identified based on image data captured using one or more cameras. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image. Computing device 110 may be configured to extract a plurality of unique facial features of a plurality of entities 120; for instance, and without limitation, facial features may include distance between eyes, shape of the cheekbones, width of the nose, depth of the eye sockets, shape of the jawline, and other unique characteristics. Plurality of unique facial features may then be used, by computing device 110, to create a plurality of facial signature or template (i.e., mathematical representations of entities' face). Identifying at least a target entity 118 may include comparing a newly captured facial signature with a plurality of facial signatures previously captured and stored, wherein each previously captured facial signature may corresponds to an entity of plurality of entities 120 and identify at least a target entity 118 from plurality of entities 120 as a function of the comparison.

With continued reference to FIG. 1, in some cases, at least a target entity 118 may include one or more named entities (i.e., specific and identifiable elements or objects) mentioned in the voice input, wherein the named entities may include names of users, departments, organizations, any other proper nouns, and/or the like. In an embodiment, computing device 110 may be configured to identify other users. In a non-limiting example, voice input 114 identified from acoustic data 104 may include a user speech: "Schedule a meeting with John on Friday," wherein "John" may be a named entity. Computing device 110 may be configured to identify at least a target entity 118 by querying such named entity within plurality of entities 120.

Still referring to FIG. 1, in some embodiments, voice recognition module 116 may include one or all of acoustic modeling, language modeling, and statistically based speech recognition algorithms. In some cases, voice recognition module 116 may employ hidden Markov models (HMMs). As discussed in greater detail below, language modeling such as that employed in natural language processing applications like document classification or statistical machine translation, may also be employed by voice recognition module 116.

With continued reference to FIG. 1, an exemplary algorithm employed by voice recognition module 116 may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, and without limitation, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMIs can be trained automatically and may be relatively simple and computationally feasible to use. In an exemplary voice recognition module 116, a hidden Markov model may be employed to output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

With continued reference to FIG. 1, in some embodiments, voice recognition module 116 may use various combinations of a number of techniques in order to improve results. In some cases, a large-vocabulary voice recognition module 116 may include context dependency for phonemes. For example, in some cases, phonemes with different left and right context may have different realizations as HMM states. In some cases, voice recognition module 116 may use cepstral normalization to normalize for different speakers and recording conditions. In some cases, voice recognition module 116 may use vocal tract length normalization (VTLN) for male-female normalization and maximum likelihood linear regression (MLLR) for more general speaker adaptation. In some cases, voice recognition module 116 may determine so-called delta and delta-delta coefficients to capture speech dynamics and might use heteroscedastic linear discriminant analysis (HLDA). In some cases, voice recognition module 116 may use splicing and a linear discriminate analysis (LDA)-based projection, which may include heteroscedastic linear discriminant analysis or a global semi-tied covariance transform (also known as maximum likelihood linear transform [MLLT]). In some cases, voice recognition module 116 may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

With continued reference to FIG. 1, in some embodiments, voice recognition module 116 may be said to decode acoustic data 104 in order to identify voice input 114. Decoding of acoustic data 104 may occur when voice recognition module 116 is presented with a new utterance and must compute a most likely voice input 114. In some cases, acoustic data decoding may include a Viterbi algorithm. A Viterbi algorithm may include a dynamic programming algorithm for obtaining a maximum a posteriori probability estimates of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, acoustic data decoding may include considering a set of good candidates and not only a best candidate, when presented with a new utterance. Candidate may include at least a portion of voice input 114. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

In some embodiments, and still referring to FIG. 1, voice recognition module 116 may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used as to cope with different speaking (i.e., acoustic data 104) speeds. In some cases, DTW may allow computing device 110 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Additionally, or alternatively, and still referring to FIG. 1, voice recognition module 116 may include a neural network. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. Neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by voice recognition module 116 for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, voice recognition module 116 is configured to identify event activation data 122 from voice input 114. As used in this disclosure, "event activation data" refers to information derived from voice input 114 that triggers a specific action related to one or more events within the system. In an embodiment, at least a portion of speech may include information containing necessary details pertaining to the management of one or more events. In some embodiments, computing device 110 may identify event activation data partially or even entirely based on voice input 114; for instance, and without limitation, in case of a complex command explicitly mentioned one or more events issued by user verbally, computing device may be configured to identify event action data 122 directly from voice input 114 by scanning through voice input 114. Conversely, in other embodiments, when user implicitly speaks one or more events, computing device 110 may utilize one or more machine learning processes as described in further detail below, to identify, project, or otherwise generate event action data 122 corresponding to the context of voice input 114. Exemplary embodiments of event activation data are described below in further detail.

Still referring to FIG. 1, an "event," for the purpose of this disclosure, is a specific occurrence or happening that is of interest or significance to one or more entities. In an embodiment, event may include a designated period of time assigned to one or more entities. In a non-limiting example, event may include a shift associated with an entity, wherein the entity may be assigned for work during the shift. Other exemplary events may include, without limitation, conference, exhibition, performance, workshop, festival, tournament, game, meeting, lecture, field trip, among others. In some cases, event may be represented as a data structure that stores the relevant information, e.g., a plurality of event data 124.

Still referring to FIG. 1, as used in this disclosure, "event data" are specific details or attributes that define and described event within an event listing 126 as described below. In an embodiment, plurality of event data 124 may include fundamental information about an event such as, without limitation, event type, event participants, event timeframe, event location, among others that are relevant to the functioning of event listing 126 as described below.

Still referring to FIG. 1, "event type," for the purpose of this disclosure, is a data element configured to identify an event. In some cases, event type may be configured to identify at least an event classification (i.e., a label of event based on one or more characteristics or properties of the event) e.g., shifts, meetings, appointments, deadlines, reminders, and/or the like. In some cases, event type may include an event identifier (ID). In a non-limiting example, computing device 110 may assign a predefined unique identifier (UID) to event. In some cases, event ID may be generated by computing device 110 in a chronological order. In a non-limiting example, event type may include a numeric or alphanumeric code containing at least a portion of code representing event timeframe as described below, helping computing device 110 and/or user to identify and differentiate events from one another.

Still referring to FIG. 1, "event participant," for the purpose of this disclosure, is a data element representing an individual or a group of individuals involved in the event. In a non-limiting example, event participant may include, without limitation, user, at least a target entity 118, or any other entities in plurality of entities 120 as described above. In some cases, event participant may include a plurality of participant designations, wherein the "participant designations" are categorization or labeling of entities that are involved in the event, for example, and without limitation, participant designations may include "organizer/supervisor," "attendee/assignee," "reviewer/manager," and/or the like. In some cases, each participant designation of plurality of participant designations may include a different right (i.e., permission or privilege to events e.g., entity role) associate with it; for instance, and without limitation, a first user who is a "supervisor" may be granted with rights to coordinate and/or organize one or more events for plurality of entities 120 including at least a target entity 118 (i.e., "assignee") while a second user who is a "manager" may be granted with rights to approve/disapprove and/or modify the events coordinated and/or organized by the first user.

Still referring to FIG. 1, "event timeframe," for the purpose of this disclosure, is a data element containing a defined period of time during which an event or series of events occur. In an embodiment, event timeframe may represent a temporal boundaries within which the event takes place or is scheduled to occur. In a non-limiting example, event timeframe may include information about the specific time range or duration associated with the event. Event timeframe described herein may be defined, by computing device 110, using at least two temporal data points as described in further detail below.

Still referring to FIG. 1, "event location," for the purpose of this disclosure, is a data element representing a specific spatial coordinates, address, or event virtual address where an event is to take place. In a non-limiting example, event location may include a specific latitude and longitude, a postal address, or a defined area (e.g., a building, an office, or a room). In some cases, event location may include an address of a workplace of at least a target entity 118 in a format of "street address (with apartment or suite number) City, State, ZIP code."

Still referring to FIG. 1, other exemplary event data 124 may include an event status (i.e., current state of the event), for example, without limitation, "waiting for assignment," "assigned," "in progress," "canceled," "complete," among other relevant indications of states or phases in which the event exist, and event descriptions (i.e., additional information that is relevant to the event) such as, without limitation, agenda for a meeting, instructions for a task, notes about the event, and the like. Persons skilled in the art, upon reviewing the entirety of this disclosure, will be aware of various types of event data 124 that may be used by computing device, singly or in combination, in modeling data structure for events, consistently with this disclosure.

In a non-limiting example, and still referring to FIG. 1, event may include a data structure with a key value pair format (e.g., a dictionary). In some cases, event may include an unordered set of key value pairs (i.e., a data structure consisting a unique identifier as a key and a corresponding value associated with the key). In a non-limiting example, provider data 106 may be expressed as "{first key value pair, second key value pair}," wherein the first key value pair and the second key value pair may be separate by a separator, and wherein both first key value pair and second key value pair may be expressed as "first/second key: first/second value;" for instance, and without limitation, first/second key may associate with a first/second event type, event participant, event time frame, event location, or the like. An exemplary event with a key value pair format may include: "eventType: Shift; eventParticipant: John; eventTimeframe: May 15$^{th}$ 9 AM—May 15$^{th}$ 5 PM; eventLocation: Location A; Role: Cashier." Other exemplary data structures suitable for representing event may include, without limitation, list, map, graph, tree, and the like. As will be appreciated by persons having ordinary skill in the art, after having read the entirety of this disclosure, the foregoing list is provided by way of example and other data structures can be added as an extension or improvements of apparatus 100 disclosed herein.

With continued reference to FIG. 1, computing device 110 is configured to obtain entity data 128 associated with the at least a target entity 118. As used in this disclosure, "entity data" are information related at least a target entity 118. As disclosed previously, at least a target entity 118 may include a named entity such as, without limitation, user, named employees/employers, and/or any other users within the network. In a non-limiting example, entity data 128 may include identification and contact data of one or more named entities, e.g., name, phone number, email address, any other data that is essential for communication and for establishing the identity of one or more first entities.

In one or more embodiments, and still referring to FIG. 1, entity data 128 may include operational data, wherein "operational data," for the purpose of this disclosure, are information and metrics related to the day-to-day operations of an entity and system or process associated with the entity. In an embodiment, operational data of at least a target entity 118 may include event data 124 of one or more events associated with at least a target entity 118 (e.g., events participated by at least a target entity 118). In such embodiment, entity data 128 may be retrieved from event listing 126 as described further in this disclosure. In some cases, operational data of at least a target entity 118 may include information derived from event data 124; for instance, and without limitation, an activity status determined by computing device 110 of at least a target entity such as "busy," "away," or "available." In some cases, entity data 128 may be obtained, using computing device 110, by comparing operational data with other data available to apparatus 100. In a non-limiting example, computing device 110 may be configured to compare event data 124 of one or more events associated with at least a target entity 118 with system data such as a current timestamp. At least a target entity 118 may be "busy" when at least an event is currently occurring, for example, the at least an event contains an event timeframe that overlaps with current timestamp. Conversely, at least a target entity 118 may be "available" when the no event associated with the at least a target entity 118 found within event listing 126 or contain event data 124 that is irrelevant.

Still referring to FIG. 1, entity data 128 includes historical event data 130. As used in this disclosure, "historical event data" are information related to past events, wherein "past events" are any events described in this disclosure that occur in the past (i.e., start and end at any time before current date and time). In an embodiment, historical event data 128 may include event data 124 that are expired (i.e., no longer valid and enforceable). In a non-limiting example, historical event data 130 may include any information associated with events at least a target entity 118 participates before identification of at least a target entity 118. Exemplary historical event data 130 may include, without limitation, event type, event participant, event timeframe, event location, event status, event description, among others of expired events.

Still referring to FIG. 1, in some embodiment, entity data 128 may include entity geographic data. As described herein, "entity geographic data" refers to any data that provides information about a geographic location of at least a target entity 118. In some cases, at least a target entity 118 may include a device such as, without limitation, a user device, a server, an equipment, a vehicle, or any object that can be geographically tracked. In some cases, entity geographic data may include a geographic indicator indicating the geographic location of at least a target entity 118; for instance, and without limitation, entity geographic data may include a specific point location (e.g., GPS coordinates), a serious of point locations (i.e., a trajectory showing at least a target entity's 118 movement over time), an area wherein at least a target entity 118 is located, or any other data that may be used to determine or infer at least a target entity's 118 geographic location.

Still referring to FIG. 1, apparatus 100 may implement one or more aspect of geofencing (i.e., a location-based technology that utilize GPS, Radio Frequency Identification [RFID], or cellular data to create a virtual boundary or "geofence" round a specific geographic area. In an embodiment, apparatus 100 may be configured to monitor and be triggered to perform any processing steps as described in this disclosure when at least a target entity 118 enters or exits the predefined surrounding environment 106. In a non-limiting example, apparatus 100 may be physically installed at a workplace of at least an entity. Apparatus 100 may continuously monitor the workplace in real-time using, without limitation, GPS signals, cellular tower singles, Wi-Fi network or other location-based technologies. In some cases, when at least a target entity 118 enters or exits the workplace, apparatus 100 may be triggered one or more predefined actions or notifications such as sending alerts, initiating one or more automated processes, generating notifications to users or administrators, among others with location-based information.

Additionally, or alternatively, and still referring to FIG. 1, entity geographic data may be used as a key to perform one or more processing steps described herein by leveraging the location-based information to determine a location of an entity. In an embodiment, computing device 110 may be configured to compare a current location with a predefined geofences or virtual boundaries set for specific event location. In some cases, geofences may be configured to represent the boundaries of different event locations. In a non-limiting example, computing device 110 may be configured to automatically update event data 124 (e.g., event status) associated with one or more events containing event location that set to a predefined geofence, when at least a target entity 118 enters the predefined geofence. It should be notated that at least a target entity 118 may be also identified, by computing device 110, as a function of entity geographic data. Exemplary embodiments of utilization of entity geographic data and/or geofences are described in further detail below.

With continued reference to FIG. 1, in some embodiments, entity data 128 may include entity preference data. As used in this disclosure, "entity preference data" refers to data that reflects the preferences or choices of at least a target entity 118 regarding to one or more events related to at least a target entity 118. In some cases, exemplary entity preference data may include a wide array of elements, including, without limitation, preferred work hours, desired roles or tasks, preferred locations, among others. In an embodiment, entity preference data may be used to customize and optimize one or more processing steps of apparatus 100; for instance, and without limitation, entity preference data may help computing device 110 tailor the scheduling process to plurality of entities 120 as described in further detail below, thereby increasing entities' satisfaction and potentially improving productivity and engagement. In a non-limiting example, entity preference data may include an event timing preferences (i.e., at least a target entity 118 may prefer participating events in the morning, afternoon, or night), event duration preferences (i.e., at least a target entity 118 may prefer longer or shorter event timeframes), event arrangement preferences (i.e., at least a target entity 118 may prefer participating events on certain days of the week), event access preferences (i.e., at least a target entity 118 may have preferences for certain roles or tasks within events), and/or the like.

With continued reference to FIG. 1, other exemplary entity data 128 may include performance data, wherein "performance data," as described herein, refers to information that are collected and analyzed to assess the performance or effectiveness of at least a target entity 118. In some cases, performance data may include data related to the performance of at least a target entity 118 during one or more events associated with at least a target entity 118. In a non-limiting example, entity data 128 may include data describing one or more reviews, ratings, feedbacks, goals, and/or the like in response to event data 124 associated with one or more events in which at least a target entity 118 is involved. In another non-limiting example, entity data 128 may include employee performance e.g., productivity metrics, attendance records, and any other indicators of employee performance and contributions. In other cases, performance data may include device, equipment, or system performance; for instance, and without limitation, data that measures the performance of machinery, equipment, device, system, network, software, among others. Such performance data may include response time, throughput, error rates, resource utilization, energy consumption, maintenance interval, and any other parameters to evaluate the reliability and efficiency of listed entities.

With continued reference to FIG. 1, apparatus 100 may be communicatively connected with a data store 132, wherein obtaining or receiving entity data 128, event data 124, and any data described herein may include retrieving from the data store 132. As used in this disclosure, "data store" is a device configured to store data such as entity data 128, event data 124, and/or any data described this disclosure. In a non-limiting example, data store 132 may include a database. Data store 132 may be implemented, without limitation, as a relational database, a key-value retrieval database such as a NOSQL database, or any other format or structure for use as a database that a person skilled in the art would recognize as suitable upon review of the entirety of this disclosure. Data store 132 may alternatively or additionally be implemented using a distributed data storage protocol and/or data structure, such as a distributed hash table or the like. Data store 132 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure.

With continued reference to FIG. 1, computing device 110 may be in communication with data store 132 remotely via one or more networks. In an embodiment, data store 132 may be disposed in a cloud environment, wherein the "cloud environment," for the purpose of this disclosure, is a set of systems and/or processes acting together to provide services in a manner that is dissociated with underlaying hardware and/or software within apparatus 100 used for such purpose and includes a cloud. A "cloud," as described herein, refers to one or more servers that are accessed over the internet. In some cases, cloud may include Hybrid Cloud, Private Cloud, Public Cloud, Community Cloud, and/or any cloud defined by National Institute of Standards and Technology (NIST). In another embodiment, computing device 110 may communicate with data store 132 via a mesh network, wherein the "mesh network," as used in this disclosure, is a local network topology (i.e., an arrangement of elements of a communication network) in which the infrastructure computing device 110 connects directly, dynamically, and non-hierarchically to as many other computing devices as possible. Additionally, or alternatively, data store 132 may include an immutable sequential listing to securely store data entity data 128 described herein. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, computing device 110 is configured to generate a voice-activated command 134 as a function of voice input 114 using a command interpretation module 136. As used in this disclosure, a "voice-activated command" is a command or operation, read and executed by computing device 110 that is triggered by user's spoken voice input 114. A "command interpretation module," for the purpose of this disclosure, is a component of apparatus 100 that is responsible for interpreting commands or instructions of a system it receives into actions that the system can perfume. In some cases, command interpretation module may be software-based. In an embodiment, command interpretation module 136 may be responsible for determining what specific action should be taken, by computing device 110, in response to voice input 114, thus generating voice-activated command 134. In a non-limiting example, command interpretation module 136 may be configured to accept voice input 114 (either text-based, voice-based, or otherwise), analyze voice input 114 to understand what action or actions are being requested, and translate the understanding into an executable form (i.e., a form that can be used by computing device 110 or other devices in the system to execute appropriate action). In an embodiment, generating voice-activated command 134 may involve not only understanding a user's speech, but also intent behind the user's speech; For instance, and without limitation, the phrase "my upcoming schedule" is not just a sequence of words, but a request for a specific action to be taken e.g., "GET" events related to entity "my" (i.e., the user) from event listing 126 as described in further detail below.

Still referring to FIG. 1, command interpretation module 136 may include one or more implementation of language processing. In one or more embodiments, command interpretation module 136 may include a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 110 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 110. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, command interpretation module 136 may be configured to interpret the meaning of voice input 114 and determine an action apparatus 100 should take in response subsequent to the identification of voice input 114 by voice recognition module 116. In an embodiment, voice-activated command 134 may control physical devices (e.g., Internet of things [IoTs]); for instance, and without limitation, "Turn on the lights" may cause apparatus 100 to send a signal to one or more smart light bulbs in surrounding environment 106, instruct the smart light bulbs to turn on. In another embodiment, voice-activated command 134 may contain one or more instructions for retrieving and presenting information; for instance, and without limitation, a voice-activated command 134 of "What's the weather like tomorrow?" may cause apparatus 100 configuring computing device 110 to look up a weather forecast and provide information related to the weather forecast. Other exemplary voice-activated command 134 are described below in further detail.

In a non-limiting example, and still referring to FIG. 1, command interpretation module 136 is configured to determine at least a maintenance operation 138 for at least an event 140 related to at least a target entity 118 as a function of event activation data 122 and historical event data 130. Computing device 110 is then configured to maintain event listing 126 containing a plurality of events associated with plurality of entities 120 in real time as a function of voice-activated command 134 by executing at least a maintenance operation 138 on event listing 126. As used in this disclosure, a "maintenance operation" is a type of voice-activated command 134 for maintaining event listing 126. In an embodiment, maintenance operation 138 may include any action or sequence of actions that serve to manage, by computing device 110, plurality of events in event listing 126.

With continued reference to FIG. 1, as used in this disclosure, an "event listing" is a structured collection of individual registrations of events that are organized and stored in a sequence based on a specific criteria. In some cases, specific criteria may include, without limitation, event type, event timeframe, event participant, event location, event status, and/or the like. In an embodiment, event listing 126 may be presented, as a data structure containing a plurality of data elements (i.e., attributes or properties) ordered in a chronological order, wherein each data element of the plurality of data elements of the data structure may represent an individual event. In a non-limiting example, event listing 126 may be configured to keep track of scheduled events e.g., shifts in a work schedule, calendar appointments, or scheduled tasks in a project management system. In some cases, event listing 126 may be viewed, sorted, and/or manipulated to help users and/or plurality of entities 120 understand and manage their schedules.

Still referring to FIG. 1, in some cases, event listing 126 may be implemented, by computing device 110, as any data structure as described in this disclosure, including, without limitation, list, array, linked list, database table, or any other data structure suitable for storing a collection of items, wherein each item in event listing 126 may represent a distinct event. In a non-limiting example, computing device 110 may be configured to initialize event listing 126 as a list such as "{Event 1, Event 2, . . . , Event N}," wherein each event (i.e., list item) may include an event timeframe (either prior or subsequent to the current timestamp), and wherein the list may be sorted according to the event timeframe of each event. As described previously, events within event listing 126 having event timeframe prior to current timestamp may be expired. In some cases, computing device 110 may be configured to remove expired events from event listing 126 and store expired events in a new list or data store 132. In other cases, events and expired events may be kept in the same event listing 126.

With continued reference to FIG. 1, at least an event 140 may be identified from voice input 114 and/or voice-activated command 134. In an embodiment, computing device 110 may identify at least an event 140 from event listing 126 by comparing at least a target entity 118 and/or event activation data 122 to event data 124 associated with events within event listing 126 and finding at least an event 140 associated with at least a target entity 118 that matches event activation data 122. In such embodiment, at least an event 140 may include an existing event. In a non-limiting example, if user says, "when is John's next shift?" Computing device 110 may be configured to look through event listing 126 and find the next shift scheduled for at least a target entity "John." In another non-limiting example, if user says, "schedule a meeting with John at 2 PM," computing device 110 may then determined at least an event 140 as a new event based on command interpretation module's 136 understanding that the user wants to create a new event that involve at least a target entity "John" as a function of specific event activation data 122.

In some cases, and still referring to FIG. 1, at least a maintenance operation 138 may include one or more operation related to event retrieval; for instance, and without limitation, computing device 110 may be configured to retrieve at least an event 140 related to at least a target entity 118 from event listing 126 in order to view or manipulate the event. Such maintenance operation 138 may include searching event listing 126 for at least an event 140 with specific event data (e.g., specific event ID, event type, event timeframe, event location, event status, and the like) or filtering the event listing 126 based on certain criteria such as, without limitation, all events on a certain date. Once at least an event 140 has been retrieved, other maintenance operations may be performed, without limitation, by computing device 110, upon the retrieved at least an event 140.

Continuing to reference FIG. 1, in some cases, computing device 110 may use a machine learning module, such as event listing operation module 142, to implement one or more algorithms or generate one or more machine learning models, such as an event identification machine learning model 144 to determine at least an event 140 related to at least a target entity 118. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Event listing operation module 142 may be used to generate event identification machine learning model 144 and/or any other machine learning model, such as temporal data point machine learning model and event placement machine learning model described below, using training data. Event identification machine learning model 144 may be trained by correlated inputs and outputs of training data. Training data may be data sets that have already been converted from raw data whether manually, by machine, or any other method. Training data may include previous outputs such that event identification machine learning model 144 iteratively produces outputs. Event identification machine learning model 144 using a machine-learning process may output converted data based on input of training data.

In an embodiment, and still referring to FIG. 1, determining at least a maintenance operation 138 may include determining at least an event 140 using event identification machine learning model 144 generated by event listing operation module 142. Event identification machine learning model 144 may be trained by training data, wherein the training data may be stored in data store 132. In a non-limiting example, determining at least an event 140 related to at least a target entity 118 using a machine learning model may include receiving event identification training data. In an embodiment, event identification training data may include a plurality of voice-activated commands that each correlated to a plurality of events. In another embodiment, event identification training data may include a plurality of voice inputs that each correlated to a plurality of events. Events may include existing events (i.e., events from event listing 126) and/or new events (i.e., events outside event listing 126). For example, and without limitation, evet identification training data may be used to show voice-activated command 134 and/or voice input 114 may indicate a particular event related to at least a target entity 118. Additionally, or alternatively, event identification training data may include a plurality of entity data that are each correlated to one of a plurality of events. In a further embodiment, event identification training data may include a plurality of historical event data correlated to a plurality of events. In such an embodiment, event identification training data may be used to show how existing events may indicate a particular new event related to at least a target entity 118. Computing device 110 may be configured to train event identification machine learning model 144 using event identification training data and determined at least an event 140 as a function of voice-activated command using trained event identification machine learning model 144.

Still referring to FIG. 1, in some cases, event identification machine learning model 144 may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 110 and/or another device may generate a classifier using a classification algorithm, defined as a processes whereby a computing device 110 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 110 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 110 may then calculate a likelihood table by calculating probabilities of different data entries and classification labels. Computing device 110 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 110 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements. Additionally, or alternatively, generating k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like.

With continued reference to FIG. 1, in an embodiment, maintenance operation 138 may include one or more operations related to event creation. Computing device 110 may determine a maintenance operation containing one or more instructions for creating one or more events, based on event activation data 122. In some cases, event activation data 122 may include at least one data element representing a portion or even entire event data associated with one or more events. In a non-limiting example, event activation data 122 may include at least a first temporal data point 146. As used in this disclosure, a "first temporal data point" refers to an initial time-related data value associated with an event. At least a first temporal data point 146 may include a datum linked to a particular timestamp or other value representing a fixed moment in time, associated with at least an event 140 related to at least a target entity 118. At least a first temporal data point 146 may include a time of creation, a time of verification, or other significant time relating to validity of at least an event 140. In some cases, at least a first temporal data point 146 may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent. Additionally, or alternatively, in some cases, at least a first temporal data point 146 may include an end time of an event. In a non-limiting example, voice input provided by user may include "Schedule a shift for John starting at 9 AM on May 16," wherein the "9 AM on May 16" may be first temporal data point corresponding to a start time of at least an event 140 e.g., a shift (i.e., event type of at least an event 140), of at least a target entity 118 "Jhon".

Still referring to FIG. 1, determining at least a maintenance operation 138 may include determining at least a second temporal data point 148 associated with at least an event 140 as a function of entity data 128. As used in this disclosure, a "second temporal data point" is another time-related value associated with at least an event 140. In a non-limiting example, at least a second temporal data point 148 may include an end time of at least an event 140. Such at least a second temporal data point 148 may be determined, by computing device 110, based on certain entity data such as, without limitation, entity preference data, historical event data 130, and/or the like. For example, and without limitation, at least a target entity 118 may include entity preference data containing a preferred event duration of 8 hours. Computing device 110 may be able to determine at least a second temporal data point 148 of "5 PM on May 16" based on at least a first temporal data point of "9 AM on May 16." Additionally, or alternatively, at least a second temporal data point 148 may be determined in real-time based on ongoing entity data 128. In a non-limiting example, computing device 110 may be continuously monitors entity geographic data to receive at least a first temporal data point 146 and/or at least a second temporal data point 148 in real time as at least a target entity 118 enters and/or exits a predetermined geographic area. In another non-limiting example, if at least a target entity 118 is working overtime, apparatus 100 may be continuously update at least a second temporal data point based on the current time or at least a target entity 118 continued presence at the workplace (i.e., surrounding environment 106). Further, at least a second temporal data point 148 may be retrieved, for example, and without limitation, from data store 132 containing event data 124 as a function of at least a first temporal data point 146 in case of existing events in event listing 126.

With continued reference to FIG. 1, determining at least a second temporal data point 148 may include determining at least a second temporal data point 148 using a machine learning model, such as, without limitation, a temporal data point machine learning model 150 generated using event listing operation module 142 as described above, based on at least a first temporal data point 146 and entity data 128. Temporal data point machine learning model 150 may be trained using temporal data point training data, wherein the temporal data point training data may be received from data store 130. In an embodiment, temporal data point training data may include a plurality of entity data 128 as input correlated to a plurality of temporal data point pairs as output. As used in this disclosure, a "temporal data point pair" is a set of temporal data points, e.g., a first temporal data point paired with a second temporal data point, to define a duration of time. In some cases, temporal data point pair may be implemented as any data structure as described in this disclosure. In a non-limiting example, temporal data point pair may be implemented as a vector, wherein the "vector," as described herein, is a data structure that represents one or more a quantitative values and/or measures of a time duration. For example, and without limitation, temporal data point training data may be used to show entity data 128 such as, without limitation, historical event data 130, e.g., previous shift schedules, may indicate a particular temporal data point pair. Determining at least a second temporal data point 148 using a machine learning model may further include determining at least a second temporal data point 148 using trained temporal data point machine learning model 150 as a function of at least a first temporal data point 146 and entity data 128.

Still referring to FIG. 1, determining at least a maintenance operation 138 may include establishing an event lifespan 152 by connecting at least a first temporal data point 146 and at least a second temporal data point 148. As used in this disclosure, a "event lifespan" refers to the duration of time from the beginning to the end of at least an event 140. In some cases, the beginning and end of the event lifespan 152 may be demarcated by certain defined points such as, without limitation, at least a first temporal data point 146 and at least a second temporal data point 148. In should be noted that, event lifespan 152 may be used interchangeably with event timeframe as described above. Additionally, or alternatively, establishing event lifespan 152 may include determining one or more sub temporal data points, wherein each two sub temporal data points may be configured to establish a sub event lifespan. In a non-limiting example, and without limitation, computing device 110 may be configured to determining one or more breaks for at least an event 140, e.g., a shift defined by the establishment of at least a first temporal data point 146 and at least a second temporal data point 148.

Still referring to FIG. 1, in some cases, event lifespan 152 may be established as a vector like temporal data point pair as described above. In some cases, event lifespan 152 may be represented as an n-tuple of values where n is one or more values. Each value of n-tuple of values may represent a measurement or other quantitative value or attribute associated with a given category of data; for example, and without limitation, temporal data points and/or sub temporal data points. Event lifespan 152 may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Event lifespan 152 may be represented, without limitation, in n-dimensional space using an axis per category of value represented in n-tuple of values, such that a vector has a geometric direction characterizing the relative quantities of attributes in the n-tuple as compared to each other. Two event lifespans may be considered equivalent where their directions, and/or the relative quantities of values within each vector as compared to each other, are the same; thus, as a non-limiting example, a vector represented as [9, 17] may be treated as equivalent, for purposes of this disclosure, as a vector represented as [0, 8]. Two event lifespans may be more similar where their directions are more similar, and more different where their directions are more divergent, for instance as measured using cosine similarity as computed using a dot product of two event lifespans; however, vector similarity may alternatively or additionally be determined using averages of similarities between like attributes, or any other measure of similarity suitable for any n-tuple of values, or aggregation of numerical similarity measures for the purposes of loss functions as described in further detail below. Any event lifespan 152 as described herein may be scaled, such that each vector represents each attribute along an equivalent scale of values. Each vector of event lifespan 152 may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make event lifespan comparison independent of absolute quantities of attributes, while preserving any dependency on similarity of attributes.

Still referring to FIG. 1, computing device 110 may include performing a trusted time evaluation of event lifespan 152. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in non-limiting example, via direct anonymous attestation (DAA)) to verify that at least an event 140 is an authentic event that has the property of attested time. Generating a secure timestamp may be used to weed out spoofers or "man in the middle attacks."

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using event data 124 and/or entity data 128. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted time-stamping procedure utilized is substantially similar to the RFC 3161 standard. In this scenario, the received data signals are locally processed at the listener device by a one-way function, e.g. a hash function, and this hashed output data is sent to a time-stamping authority (TSA). The use of secure timestamps as described herein may enable systems and methods as described herein to instantiate attested time. Attested time is the property that a device incorporating a local reference clock may hash data, e.g., event data 124 and/or entity data 128 along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, data store 132 or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Still referring to FIG. 1, computing device 110 may then determine at least a maintenance operation 138 for at least an event 140 as a function of event lifespan 152. Such at least a maintenance operation 138 may include instructions configuring computing device 110 to create a new event as a function of established event lifespan 152. In an embodiment, at least an event 140 may be created by assigning event lifespan 152 to an event instance using computing device 110. In a non-limiting example, at least a maintenance operation 138 may include at least an instruction configuring computing device 110 to initialize at least a new event instance, wherein the instruction may contain event lifespan 152 as one of the parameters for the initialization process. Other exemplary parameters may include, without limitation, at least a target entity 118, event type, event location, and/or the like. In a non-limiting example, at least a maintenance operation 138 determined based on voice-activated command "Schedule John a shift today starting at 12 PM" may include, without limitation, an instruction for computing device 110: "new Event(EventType. SHIFT, Entities. getTargetEntity("John"), [12, 17]);" wherein event lifespan "[12, 17]" may include at least a second temporal data point "17" that is determined based on at least a first temporal data point "12" and entity data e.g., entity preferred work hours, previous shift schedule, and/or the like (using temporal data point machine learning model 150 as described above). In some cases, event lifespan 152 may also be established based on temporal data points determined based other events' event lifespans; for instance, and without limitation, at least a first temporal data point 146 may be determined as a second temporal data point of a first event's event lifespan and at least a second temporal data point 148 may be determined as a first temporal data point of a second event's event lifespan, wherein the second event is subsequent to the first event. Computing device may further insert/add at least an event 140 into plurality of events of event listing 126; for instance, and without limitation, at least an event 140 may be created and add to event listing 126 via one or more application programing interface (API) calls.

With continued reference to FIG. 1, in some cases, at least a maintenance operation 138 may include one or more operations related to event modification. In an embodiment, determining at least a maintenance operation 138 may include validating at least an event 140 against plurality of events within event listing 126. In some cases, computing device 110 may be configured to check event activation data 122 or event data 124 associated with newly created at least an event 140 against event data 124 of existing events within event listing 126 to ensure there are no conflicts or inconsistencies. In some cases, validation of at least an event 140 may be essential to maintain the integrity and reliability of event listing 126. In a non-limiting example, validating at least an event 140 against plurality of events may include locating, by computing device 110, an event disagreement 154 associated with at least an event 140 within event listing 126.

Still referring to FIG. 1, as used in this disclosure, an "event disagreement" refers to any situation where information associated with one event conflicts with or contradicts information associated with another event in event listing 126. In some cases, event disagreement 154 may represent a state in which there is inconsistency or discrepancy between event data 124 such as, without limitation, event IDs, event participants, event timeframes, event locations, and/or the like. In a non-limiting example, event disagreement 154 may present in variety of reasons including overlapping schedules, exceeding limits on work hours, violating mandatory rest periods, or conflicting locations, among others. Any situation where proposed event (i.e., at least an event 140) may result in a violation of the established rules or constraints for scheduling may be considered as event disagreement 154.

In a non-limiting example, and still referring to FIG. 1, if two or more events e.g., shifts at different event locations are assigned to the same employee (i.e., target entity), computing device 110 may identify such situation as event disagreement 154 since at least a target entity 118 cannot be in more than two locations at once. Similarly, if initializing a new event and associating the new event to at least a target entity 118 that would cause entity data 128 associated with at least a target entity 118 to alter in a negative way e.g., exceed maximum allowed work hours for the week, may be also considered as event disagreement 154 by computing device 110.

Still referring to FIG. 1, determining at least a maintenance operation 138 may include determining at least a maintenance operation 138 as a function of event disagreement 154. Computing device 110 may be configured to determine one or more maintenance operations 138 based on potential conflicts between event in question and existing events in event listing, and check event in question against various constraints or rules that apply to the event scheduling process such as without limitation, rules around minimum rest periods between shifts, maximum shift lengths, mandatory breaks, and/or the like. Once computing device 110 identified event disagreement 154, one or more maintenance operations 138 containing instructions configuring computing device 110 to resolve conflicts and/or violations of constraints within event listing 126 may be determined. Such maintenance operations 138 may include, without limitation, adjusting event activation data 122, adjusting event lifespan 152, switching target entities, or even alerting user to issue and requesting further voice input 114 for additional voice-activated commands 134. In some cases, at least a maintenance operation 138 may include restrictions on which parts of an event or groups of events can be modified and who may modify them.

In a non-limiting example, and still referring to FIG. 1, a user such as a manager may user a voice-activated command to schedule a new shift for an employee (i.e., at least a target entity 118): "Schedule a shift for John from 2 PM to 10 PM tomorrow." Command interpretation module 136 may interprets the voice-activated command and generates a new shift event with specified event activation data "2 PM to 10 PM tomorrow;" However, before computing device 110 add the new shift event to event listing 126, apparatus 100 may validate new shift event against existing events. Computing device 110 may be configured to check event listing 126 for any other shift events assigned to at least a target entity 118 "John" that might overlap with new shift event. Computing device 110 may also check whether the new shift event, combined with existing shift events associated with "John" would exceed any limits on his work hours or disagree with any predefined entity preferences. If no event disagreements 154 are found, computing device 110 may then add new shift event to event listing, otherwise, at least a maintenance operation 138 configured to modify plurality of events or event listing 126 to resolve detected event disagreement 154 may be determined and executed, by computing device 110, to maintain the integrity and reliability of event listing 126 and ensure that all event adhere to established rules and constraints, thereby preventing errors and inefficiencies in scheduling plurality of events.

With continued reference to FIG. 1, determining the at least a maintenance operation 138 may also include determining an event placement 156 for each event of plurality of events within the event listing 126 as a function of entity data 128 and determining at least a maintenance operation 138 as a function of event placement 156 of each event of plurality of events. An "event placement," for the purpose of this disclosure, refers to the position or location of an event within the sequence or structure of overall event listing 126. In some cases, event placement 156 may incorporate, without limitation, timing of event e.g., event timeframe or event lifespan 152, event's order relative to other events (e.g., whether the event comes before or after other events), or event's assignment to a particular entity or resources. In an embodiment, determining event placement 156 for each event of plurality of events may include analyzing entity data 128 of plurality of entities 120. In a non-limiting example, information within entity data 128 such as, without limitation, entity availability, entity skill sets, entity preferences and the like may be used to decide where each event should be positioned within event listing 126 e.g., a schedule. For example, and without limitation, if entity prefers morning shifts, events involving that entity may be placed earlier in the day. For another example, and without limitation, if certain events require participant with specific skills, events may be placed at times when entities with necessary skills are available. At least a maintenance operation 138 generated as a function of event placement 156 may include arranging or rearranging plurality of events within event listing 126 according to event placement 156 of event of plurality of events; for instance, and without limitation, such at least a maintenance operation 138 may include instructions configuring computing device 110 to generate a complete working schedule. Maintaining event listing 126 may further include modifying event listing 126 by arranging plurality of events according to event placement 156 of each event of plurality of events.

With continued reference to FIG. 1, determining event placement 156 for each event of plurality of events within event listing 126 may include determining event placement 156 using a machine learning model such as event placement machine learning model 158 generated by event listing operation machine learning module 142 as described above. Event placement machine learning model 158 may be trained using event placement training data, wherein the event placement training data may include a plurality of entity data as input correlated to a plurality of event placements of plurality of events as output. In some cases, event placement training data may be received from data store 132. For example, and without limitation, event placement training data may be used to show certain positions or locations of event listing 126 are more suitable to place a particular event of plurality of events. Determining event placement 156 for each event of plurality of events within event listing 126 may further include determining event placement 156 for plurality of events using the trained event placement machine learning model 158 as a function of entity data 128.

With continued reference to FIG. 1, in some cases, at least a maintenance operation 138 determined by computing device 110 based on voice-activated command 134 may contain instructions enabling user or plurality of entities 120 to interact with plurality of events or event listing 126. In some cases, plurality of events may be interactive in various ways. In a non-limiting example, user may be able to RSVP to one or more events, add comments or attach files to one or more events, handling emergency procedures of one or more events, and/or perform other actions that interact with plurality of events. In some cases, interactions between plurality of entities and event listing 126 may be managed by updating the relevant information on one or more event and saving the changes to the event listing 126. In a non-limiting example, user and/or plurality of entities may be able to "approve" and "sign off," or "reject" timecards using voice-activated command 134.

Additionally, or alternatively, and still referring to FIG. 1, apparatus 100 may include integration with other resources such as third party devices, services, or platforms that may enable computing device 110 to determine and generate more complex maintenance operations. In an embodiment, apparatus 100 may be integrated with human resource management system (HRMS) or other HR platforms, allowing apparatus 100 to access additional data such as, without limitation, employee vacation request, payroll data, performance metrics, among others which may be used to inform more complex maintenance operations. In another embodiment, third party event listing may be integrated, for example, and without limitation, GOOGLE CALENDAR, MICROSOFT OUTLOOK, and/or the like may be integrated with event listing 126, allowing apparatus to coordinate events with personal calendars, reducing the risk of generating event disagreement 154 and improving user experience. In another embodiments, apparatus 100 may also be integrated with communication platforms such as, without limitation, SLACK, MICROSOFT TEAMS, and/or the like, allowing automated notifications about event changes, reminders, or other important event data to be send directly to plurality of entities through the platform. In another embodiment, in surrounding environment 106 where IoT devise are used, apparatus 100 may interact with these devices to facilitate maintenance operations; for instance, and without limitation, IoT devices may provide real-time location data of plurality of entities 120, which may be used to manage plurality of events in a more dynamic, real-time manner. In a further embodiment, apparatus 100 may be integrated with a third party analytics tool configured to provide detailed insight into event performance, entity efficiency, and other factors that may be used to optimize event listing 126 and make more informed decisions about generating at least a maintenance operation 138.

With continued reference to FIG. 1, apparatus 100 may include an output device. For the purposes of this disclosure, "output device" is a device that outputs information. In some embodiments, the output device may be incorporated wholly or in part in apparatus 100. In some cases, output device may be coupled directly to apparatus 100 or may be communicated connected to apparatus 100 via a network. In a non-limiting example, output device may include an audio device. For the purposes of this disclosure, an "audio device" is a device that outputs audio information or data. As a non-limiting example, audio device may include a speaker. For the purposes of this disclosure, a "speaker" is a device that converts electrical signals into sound waves that can be heard by the human ear. In another embodiment, the output device may include a tactile device. For the purposes of this disclosure, a "tactile device" is a device that outputs information that is intelligible using the sense of touch. In some embodiments, the tactile device may include a haptic output such as a vibration. In some embodiments, the tactile device may produce patterns having geometric forms that are intelligible to output device using the sense of touch; for instance, the tactile device may output letters in braille using a set of retractable pins or bumps that can be extended and retracted to form braille characters, similarly to devices used with screen readers. In some embodiments, the tactile device may output other recognizable shapes, such as directional arrows or geometric forms; the tactile device may, as another example, output a map vignette of surrounding environment 106.

With further reference to FIG. 1, apparatus 100 is further configured to display event listing 126 using a user interface 160. User interface 160 may be presented via output device such as a display (e.g., a light emitting diode [LED] screen, liquid crystal display [LCD], organic LED, cathode ray tube [CRT], touch screen, or any combination thereof). For the purposes of this disclosure, a "user interface" is a means by which a user or entity and a computer system interact; for example, and without limitation, through the use of user devices and software. A user interface may include a graphical user interface (GUI), command line interface (CLI), menu-driven user interface, touch user interface, voice user interface (VUI), form-based user interface, any combination thereof and the like. In some embodiments, user and/or entity may interact with use interface 160 using a computing device distinct from and communicatively connected to computing device 110. For example, a smart phone, smart, tablet, or laptop operated by user and/or entity. In some embodiments, user interface 160 may include icons, menus, other visual indicators or representations (graphics), audio indicators such as primary notation, and display information and related user controls. In a non-limiting example, user interface 160 may include a menu containing a list of choices and may allow user and/or entity to select one from them via voice input 114. In some cases, a menu bar may be displayed horizontally across the screen such as pull-down menu. Additionally, or alternatively, files, programs, web pages and the like may be represented using a small picture in a GUI. For example, and without limitation, links to each event of plurality of events within even listing 126 may be incorporated using small graphics. Further, user interface 160 may include a shared user interface, wherein the shared user interface is a user interface that is designed for use by more than one user and/or entities simultaneously or otherwise sequentially. In a non-limiting example, a shared user interface may be displayed using a public computing device such as a kiosk.

Figure 2:
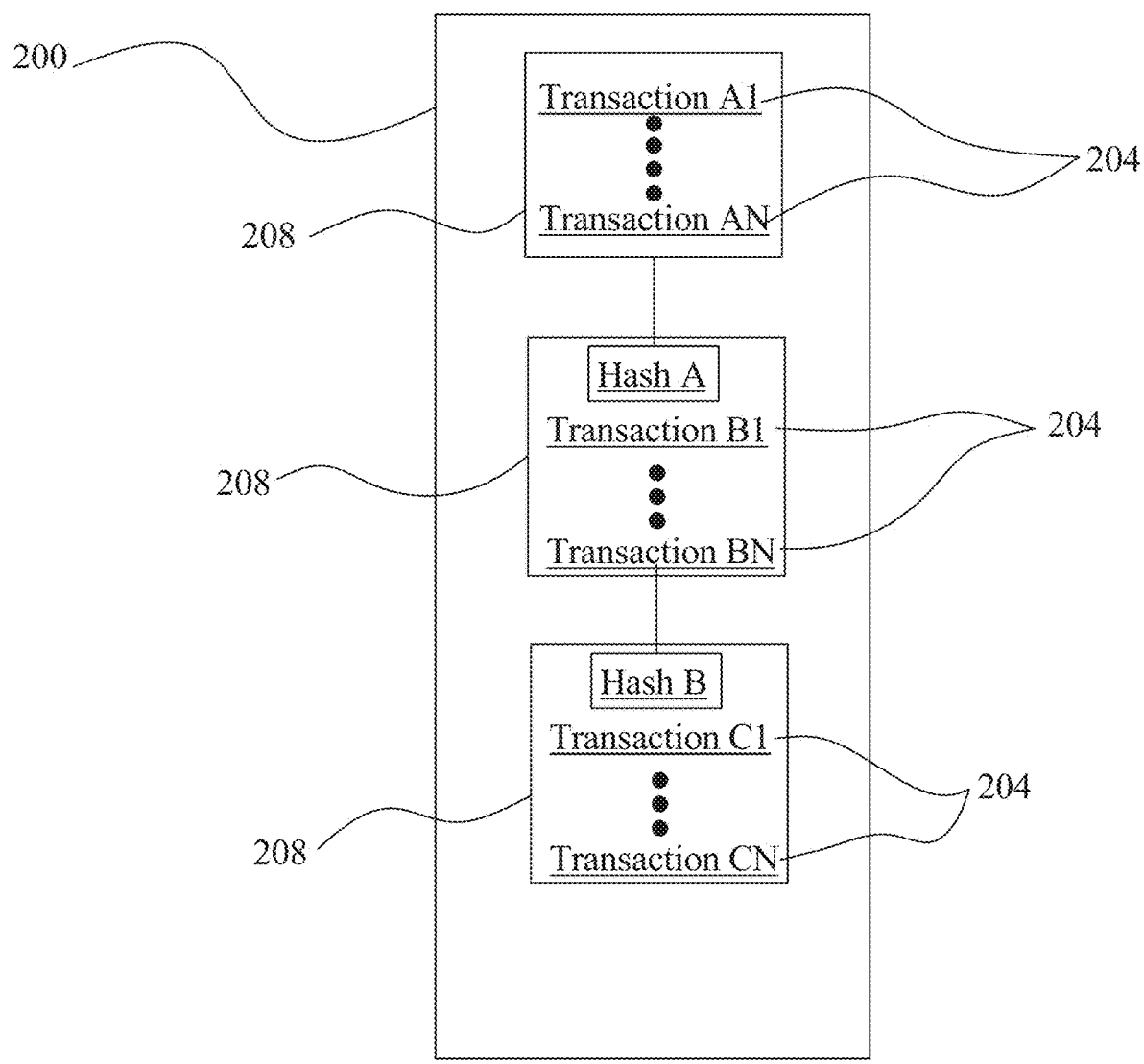
FIG. 2 an exemplary embodiment of an immutable sequential listing.

Referring now to FIG. 2, an exemplary embodiment of an immutable sequential listing 200 is illustrated. An immutable sequential listing may be, include and/or implement an immutable ledger, where data entries that have been posted to the immutable sequential listing cannot be altered. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
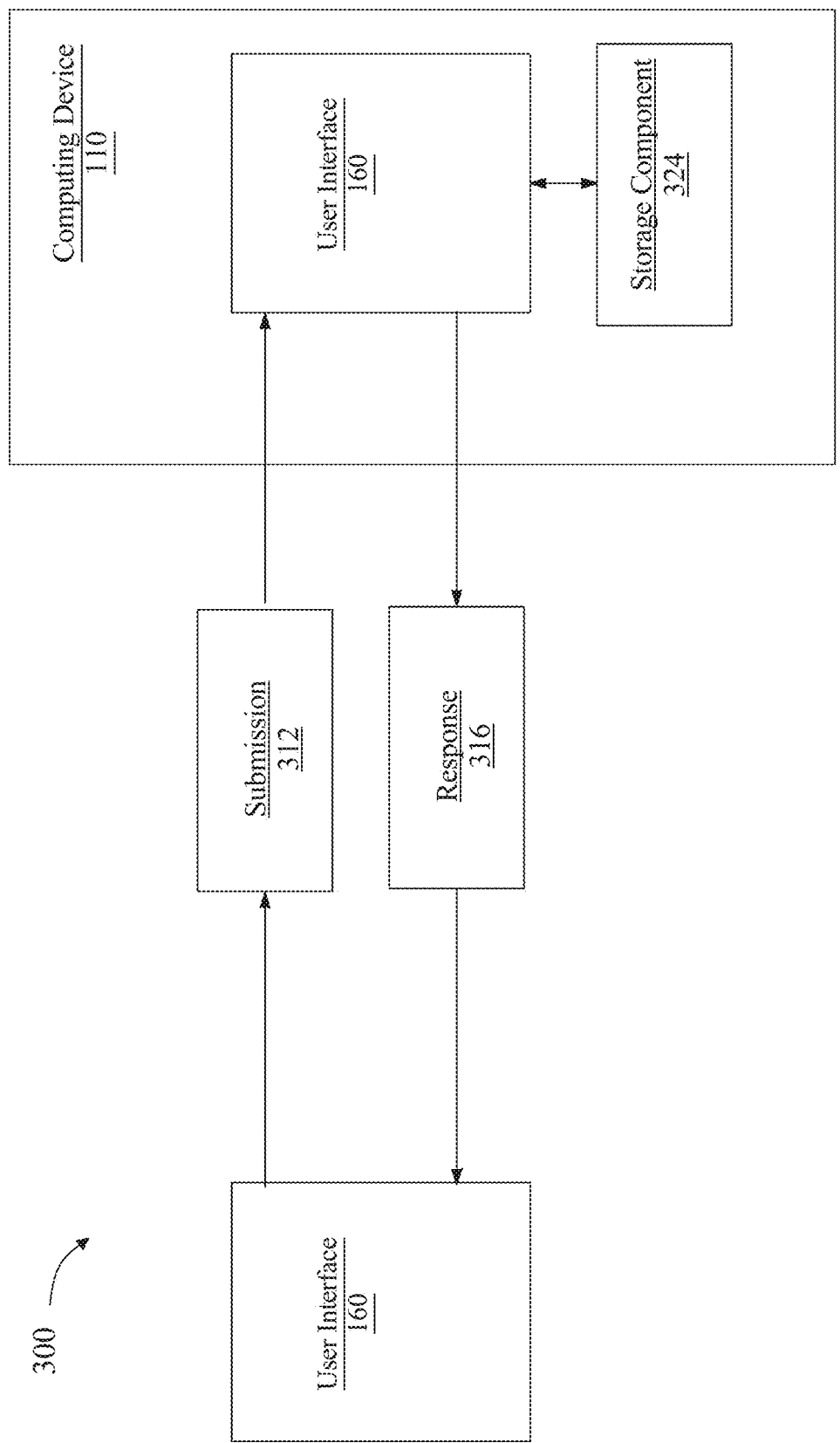
FIG. 3 is a block diagram of a chatbot system.

Referring to FIG. 3, a chatbot system 300 is schematically illustrated. According to some embodiments, a user interface 160 may be communicative with a computing device 110 that is configured to operate a chatbot. In some cases, user interface 160 may be local to computing device 110. Alternatively, or additionally, in some cases, user interface 160 may remote to computing device 110 and communicative with the computing device 110, by way of one or more networks, such as without limitation the internet. Alternatively, or additionally, user interface 160 may communicate with computing device 110 using telephonic devices and networks, such as without limitation fax machines, short message service (SMS), or multimedia message service (MMS). Commonly, user interface 160 communicates with computing device 110 using text-based communication, for example without limitation using a character encoding protocol, such as American Standard for Information Interchange (ASCII). Typically, a user interface 160 conversationally interfaces a chatbot, by way of at least a submission 312, from the user interface 308 to the chatbot, and a response 316, from the chatbot to the user interface 160. In many cases, one or both submission 312 and response 316 are text-based communication. Alternatively, or additionally, in some cases, one or both of submission 312 and response 316 are audio-based communication.

Continuing in reference to FIG. 3, a submission 312 once received by computing device 110 operating a chatbot, may be processed by a processor. In some embodiments, processor processes a submission 312 using voice recognition module 116 and/or command interpretation module 136. In some embodiments, processor employs real-time learning with evolutionary algorithms. In some cases, processor may retrieve a pre-prepared response from at least a storage component 320, based upon submission 312. Alternatively, or additionally, in some embodiments, processor communicates a response 316 without first receiving a submission 312, thereby initiating conversation. In some cases, processor communicates an inquiry to user interface 160; and the processor is configured to process an answer to the inquiry in a following submission 312 from the user interface 160.

In some cases, an answer to an inquiry presents within a submission 312 from a user device as described above with reference to FIG. 1 may be used by computing device 110 as an input to another function.

Figure 4:
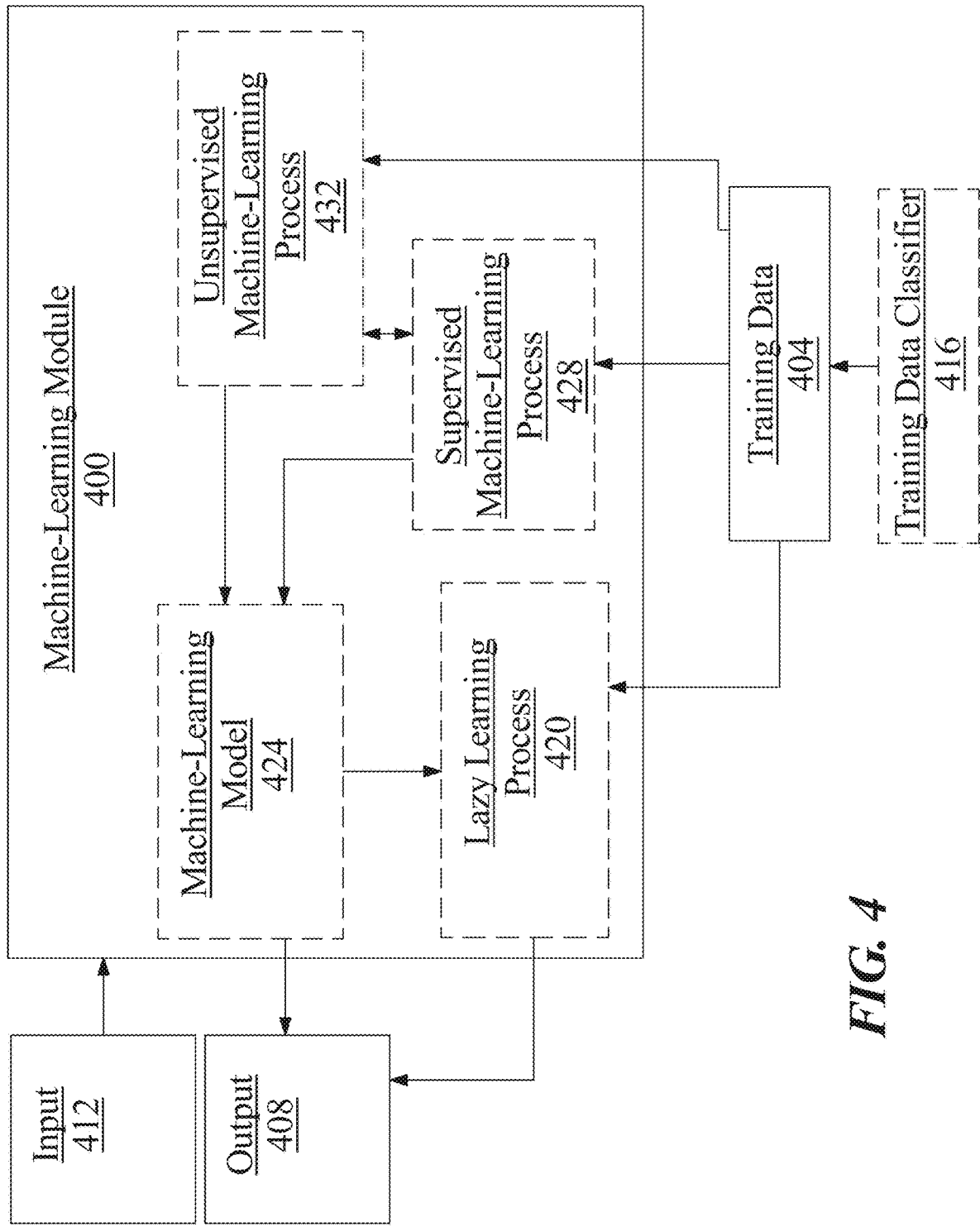
FIG. 4 is a block diagram of an exemplary embodiment of a machine learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. Scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods.

Machine-learning algorithms may include neural net algorithms, including convolutional neural net processes.

Figure 5:
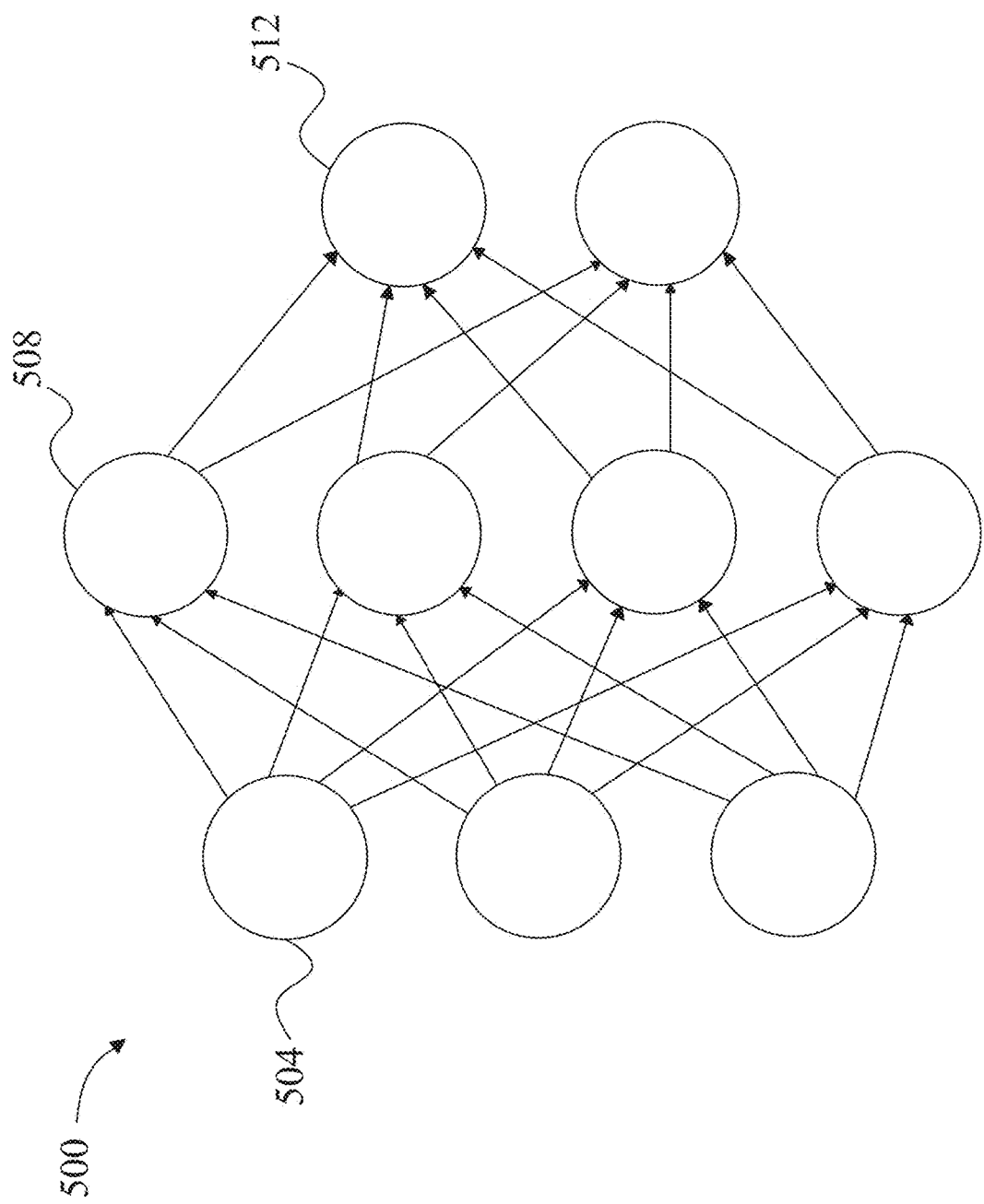
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
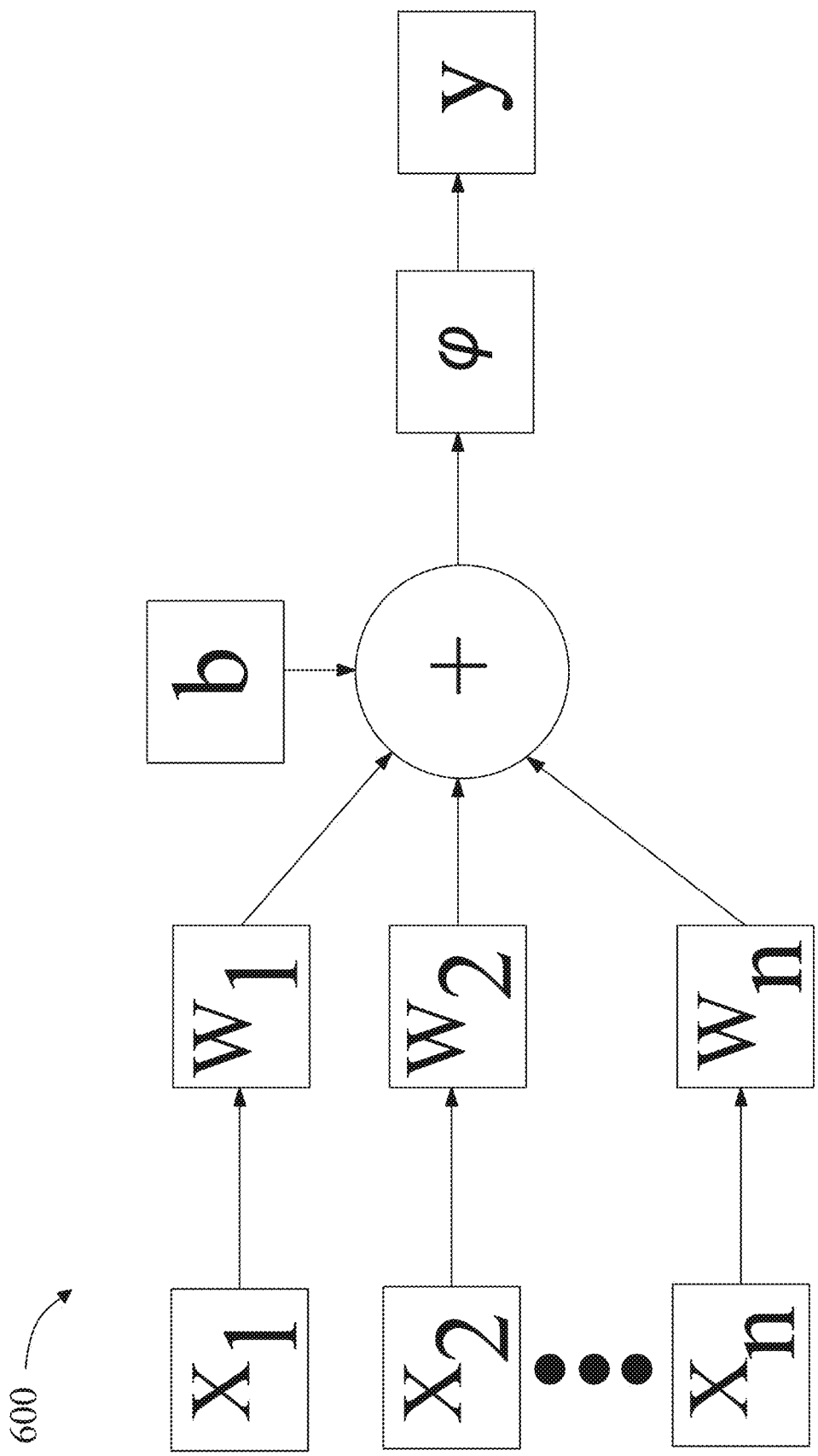
FIG. 6 is a diagram of an illustrative embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tank (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(ax, x)$ for some a, an exponential linear units function such as $f(x)=\{x$ for $x \geq 0$ $a(e^x-1)$ for $x<0$ for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $f(x)=\lambda\{a(e^x-1)$ for $x<0$ x for $x \geq 0$ Fundamentally, there is no limit to the nature of functions of inputs $x_i$ that may be used as activation functions. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
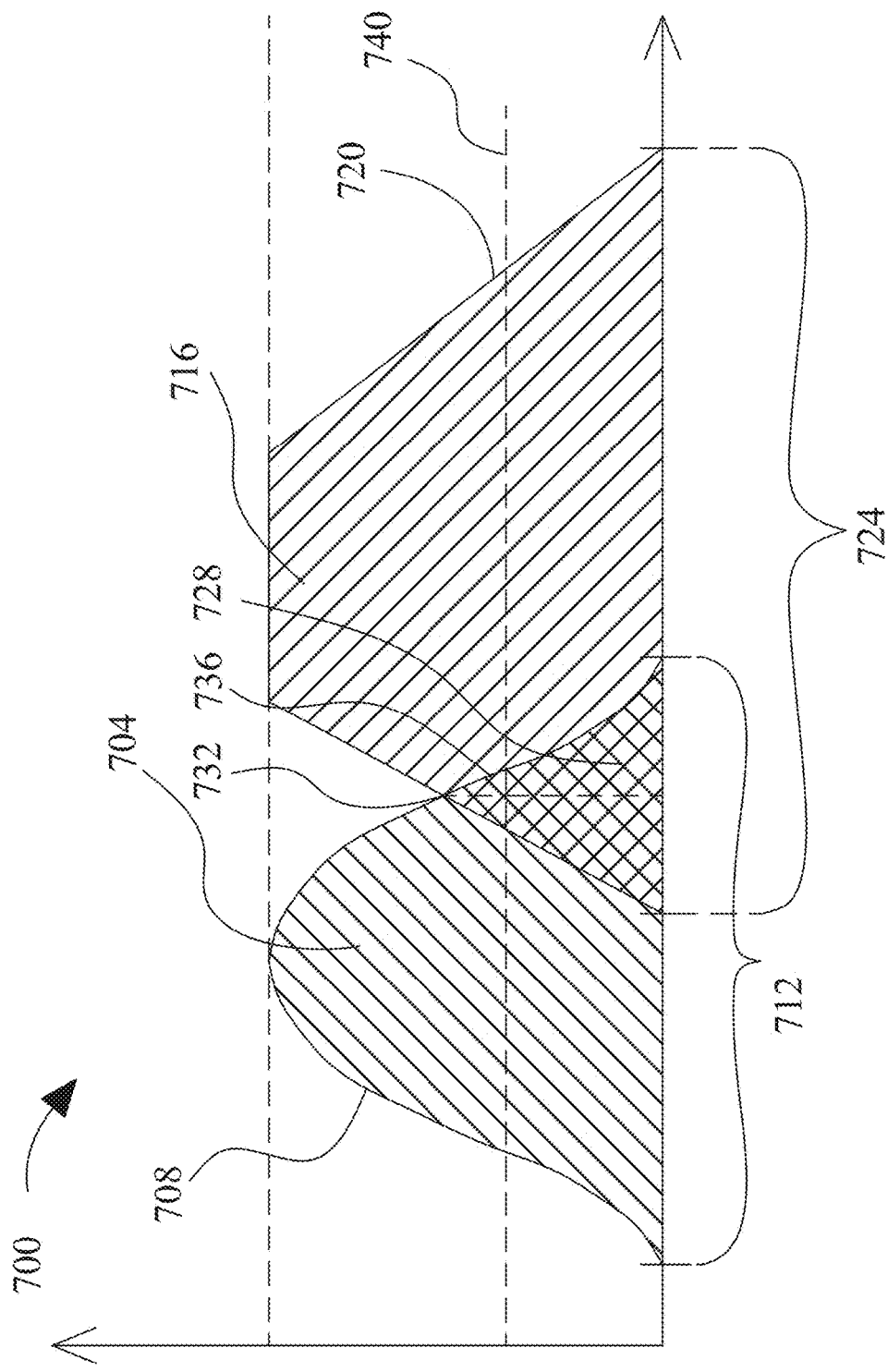
FIG. 7 is a graph illustrating an exemplary relationship between fuzzy sets.

Referring now to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0,1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 7, first fuzzy set 704 may represent any value or combination of values as described above, including output from one or more machine-learning models. A second fuzzy set 716, which may represent any value which may be represented by first fuzzy set 704, may be defined by a second membership function 720 on a second range 724; second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively, or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models. Alternatively, or additionally, each threshold may be tuned by a machine-learning and/or statistical process, for instance and without limitation as described in further detail below.

Figure 8:
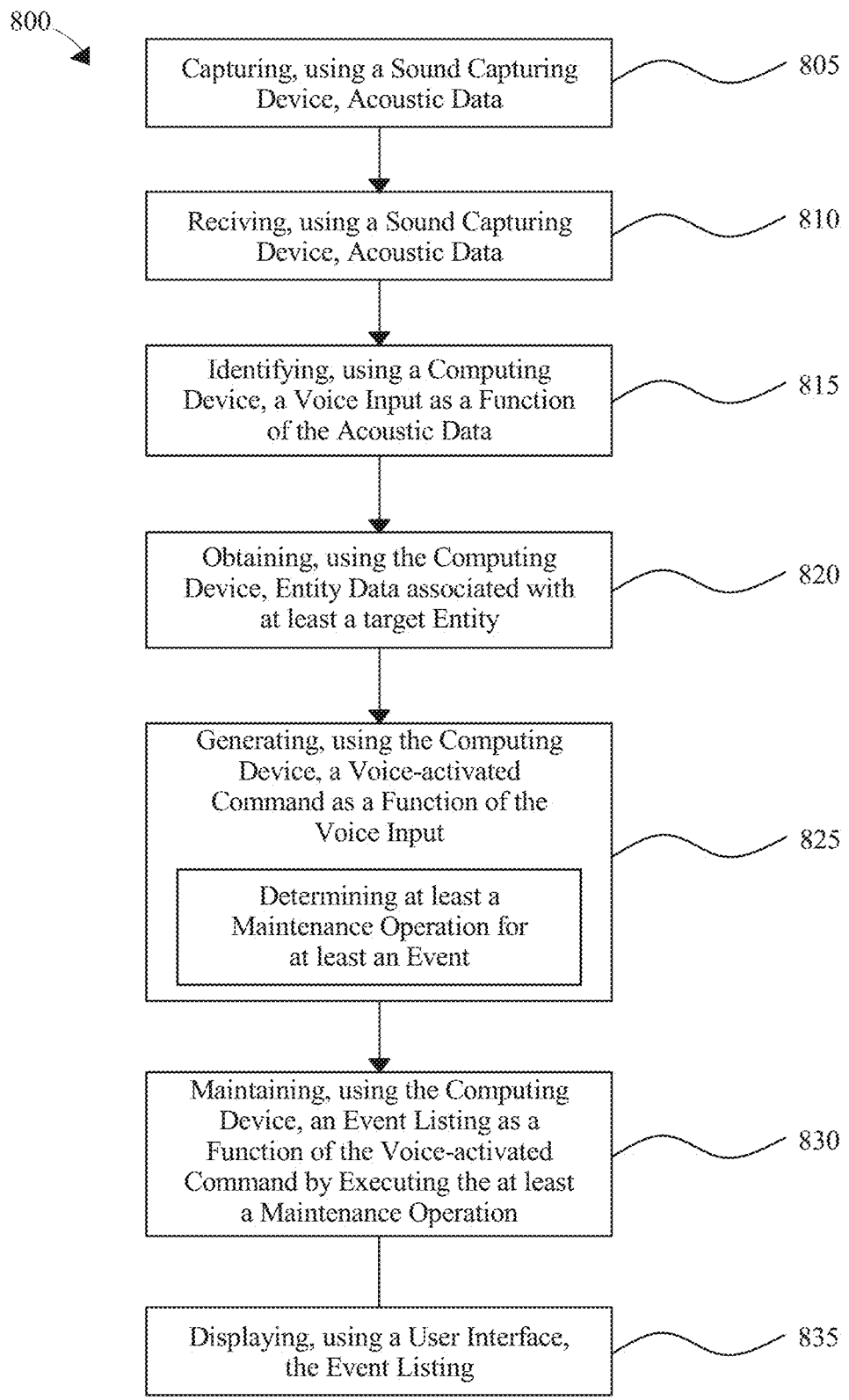
FIG. 8 is a flow diagram of an exemplary method for maintaining an event listing using voice control.

Referring now to FIG. 8, a flow diagram of an exemplary method 800 for maintaining an event listing using voice control is illustrated. Method 800 includes a step 805 of capturing, using a sound capturing device, acoustic data from a surrounding environment. This may be implemented, without limitation, as described above with reference to FIGS. 1-7.

With continued reference to FIG. 8, method 800 includes a step 810 of receiving, using a computing device, the acoustic data from the sound capturing device. This may be implemented, without limitation, as described above with reference to FIGS. 1-7.

With continued reference to FIG. 8, method 800 includes a step 815 of identifying, using the computing device, a voice input as a function of the acoustic data via a voice recognition module, wherein the voice recognition module is configured to identify at least a target entity from a plurality of entities and identify event activation data from the voice input. In some embodiments, event activation data may include at least a first temporal data point associated with the at least an event. This may be implemented, without limitation, as described above with reference to FIGS. 1-7.

With continued reference to FIG. 8, method 800 includes a step 820 of obtaining, using the computing device, entity data associated with the at least a target entity, wherein the entity data includes historical event data. In some embodiments, entity data may include entity preference data. This may be implemented, without limitation, as described above with reference to FIGS. 1-7.

With continued reference to FIG. 8, method 800 includes a step 825 of generating, using the computing device, a voice-activated command as a function of the voice input via a command interpretation module, wherein the command interpretation module is configured to determine at least a maintenance operation for at least an event related to the at least a target entity as a function of event activation data and the historical event data. In some embodiments, the command interpretation module may include a language processing module. This may be implemented, without limitation, as described above with reference to FIGS. 1-7.

In some embodiments, and still referring to FIG. 8, determining the at least a maintenance operation may include training an event identification machine learning model using event identification training data, wherein the event identification training data may include a plurality of voice-activated command as input correlated to a plurality of events as output and determining the at least an event as a function of the voice-activated command using the trained event identification machine learning model. This may be implemented, without limitation, as described above with reference to FIGS. 1-7.

In some embodiments, and still referring to FIG. 8, determining the at least a maintenance operation may include determining at least a second temporal data point associated with the at least an event as a function of the entity data, establishing an event lifespan by connecting the at least a first temporal data point with the at least a second temporal data point, and determining the at least a maintenance operation for the at least an event as a function of the event lifespan. This may be implemented, without limitation, as described above with reference to FIGS. 1-7.

In some embodiments, and still referring to FIG. 8, determining the at least a maintenance operation may include validating the at least an event against the plurality of events, wherein validating the at least an event may include locating an event disagreement associated with the at least an event within the event listing, and determining the at least a maintenance operation as a function of the location of the event disagreement. This may be implemented, without limitation, as described above with reference to FIGS. 1-7.

In other embodiments, and still referring to FIG. 8, determining the at least a maintenance operation may include determining an event placement for each event of the plurality of events within the event listing as a function of the entity data and determining the at least a maintenance operation as a function of the event placement of each event of the plurality of events. This may be implemented, without limitation, as described above with reference to FIGS. 1-7.

With continued reference to FIG. 8, method 800 includes a step 830 of maintaining, using the computing device, an event listing comprising a plurality of events associated with the plurality of entities in real time as a function of the voice-activated command by executing the at least a maintenance operation on the event listing. In some embodiments, maintaining the event listing may include initializing the at least an event as a function of the execution of the at least a maintenance operation on the event listing and inserting the at least an event into the plurality of events. In other embodiments, maintaining the event listing may include modifying the event listing by arranging the plurality of events according to the event placement of each event of plurality of events. This may be implemented, without limitation, as described above with reference to FIGS. 1-7.

With continued reference to FIG. 8, method 800 includes a step 835 of displaying, using a user interface, the event listing. This may be implemented, without limitation, as described above with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
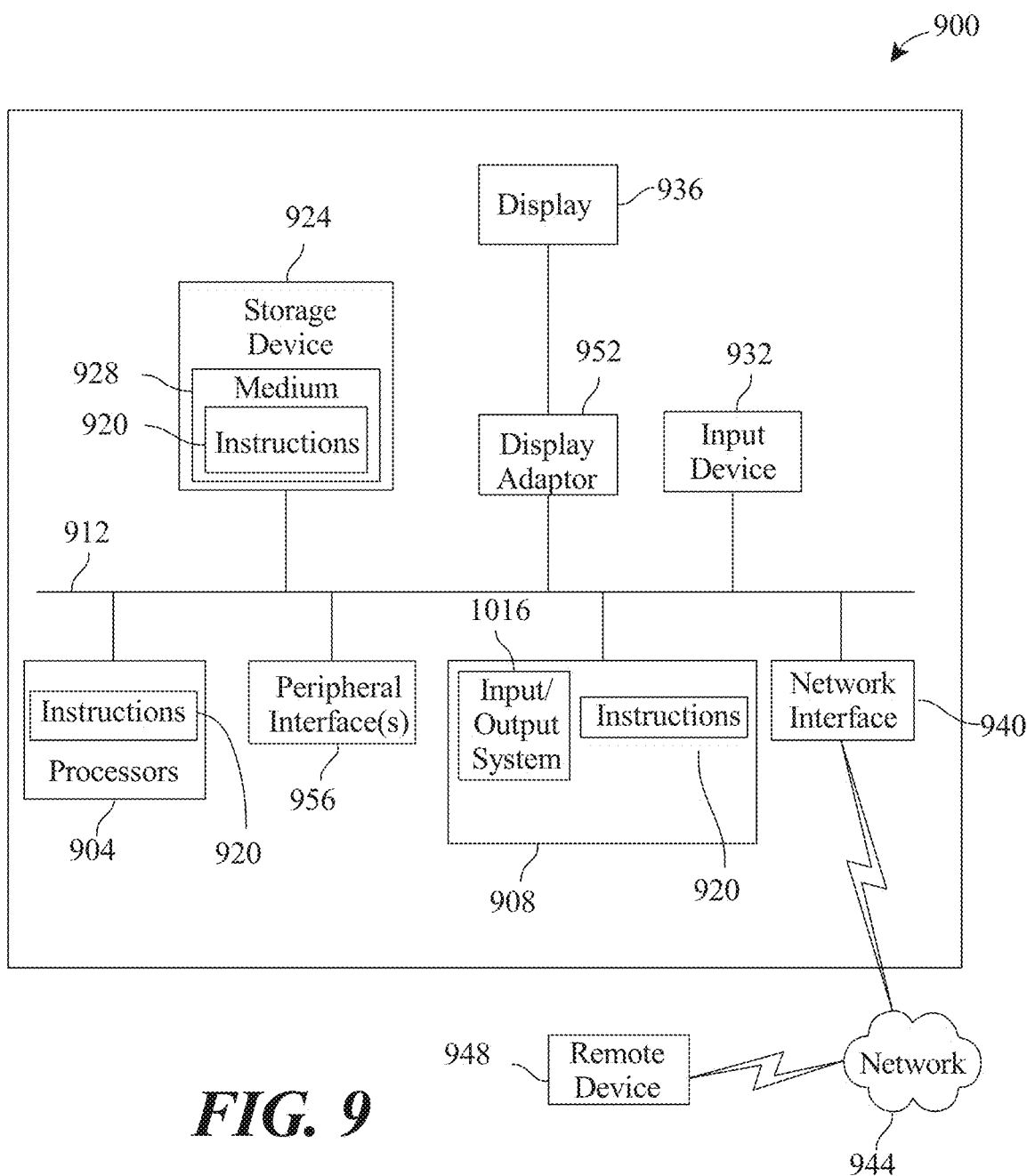
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for maintaining an event listing using voice control, the apparatus comprises:
   a sound capturing device configured to capture acoustic data from a surrounding environment; and
   a computing device communicatively connected to the sound capturing device, wherein the computing device is configured to:
      receive the acoustic data from the sound capturing device;
      identify a voice input as a function of the acoustic data using a voice recognition module, wherein the voice recognition module is configured to:
         identify at least a target entity from a plurality of entities; and
         identify event activation data from the voice input;
      obtain entity data associated with the at least a target entity, wherein the entity data comprises historical event data;
      generate a voice-activated command as a function of the voice input using a command interpretation module, wherein the command interpretation module is configured to:
         determine at least a maintenance operation for at least an event related to the at least a target entity as a function of the event activation data and the historical event data;
      maintain the event listing comprising a plurality of events associated with the plurality of entities in real time as a function of the voice-activated command by executing the at least a maintenance operation on the event listing, wherein maintaining the event listing comprises:

initializing the at least an event as a function of the execution of the at least a maintenance operation on the event listing; and inserting the at least an event into the plurality of events; and display the event listing using a user interface.

2. The apparatus of claim 1, wherein the event activation data comprises at least a first temporal data point associated with the at least an event.

3. The apparatus of claim 1, wherein the entity data comprises entity preference data.

4. The apparatus of claim 1, wherein the command interpretation module comprises a language processing module.

5. The apparatus of claim 1, wherein determining the at least a maintenance operation comprises:

training an event identification machine learning model using event identification training data, wherein the event identification training data comprises:

a plurality of voice-activated commands as input correlated to a plurality of events as output; and determining the at least an event as a function of the voice-activated command using the trained event identification machine learning model.

6. The apparatus of claim 2, wherein determining the at least a maintenance operation comprises:

determining at least a second temporal data point associated with the at least an event as a function of the entity data;

establishing an event lifespan by connecting the at least a first temporal data point with the at least a second temporal data point; and determining the at least a maintenance operation for the at least an event as a function of the event lifespan.

7. The apparatus of claim 1, wherein determining the at least a maintenance operation comprises:

validating the at least an event against the plurality of events, wherein validating the at least an event comprises:

locating an event disagreement associated with the at least an event within the event listing; and determining the at least a maintenance operation as a function of the location of the event disagreement.

8. The apparatus of claim 1, wherein determining the at least a maintenance operation comprises:

determining an event placement for each event of the plurality of events within the event listing as a function of the entity data; and determining the at least a maintenance operation as a function of the event placement of each event of the plurality of events.

9. The apparatus of claim 8, wherein maintaining the event listing comprises:

modifying the event listing by arranging the plurality of events according to the event placement of each event of plurality of events.

10. A method for maintaining an event listing using voice control, the method comprises:

capturing, using a sound capturing device, acoustic data from a surrounding environment;

receiving, using a computing device, the acoustic data from the sound capturing device;

identifying, using the computing device, a voice input as a function of the acoustic data via a voice recognition module, wherein the voice recognition module is configured to:

identify at least a target entity from a plurality of entities; and identify event activation data from the voice input;

obtaining, using the computing device, entity data associated with the at least a target entity, wherein the entity data comprises historical event data;

generating, using the computing device, a voice-activated command as a function of the voice input via a command interpretation module, wherein the command interpretation module is configured to:

determine at least a maintenance operation for at least an event related to the at least a target entity as a function of the event activation data and the historical event data;

maintaining, using the computing device, the event listing comprising a plurality of events associated with the plurality of entities in real time as a function of the voice-activated command by executing the at least a maintenance operation on the event listing, wherein maintaining the event listing comprises:

initializing the at least an event as a function of the execution of the at least a maintenance operation on the event listing; and inserting the at least an event into the plurality of events; and displaying, using a user interface, the event listing.

11. The method of claim 10, wherein the event activation data comprises at least a first temporal data point associated with the at least an event.

12. The method of claim 10, wherein the entity data comprises entity preference data.

13. The method of claim 10, wherein the command interpretation module comprises a language processing module.

14. The method of claim 10, wherein determining the at least a maintenance operation comprises:

training an event identification machine learning model using event identification training data, wherein the event identification training data comprises:

a plurality of voice-activated commands as input correlated to a plurality of events as output; and determining the at least an event as a function of the voice-activated command using the trained event identification machine learning model.

15. The method of claim 10, wherein determining the at least a maintenance operation comprises:

determining at least a second temporal data point associated with the at least an event as a function of the entity data;

establishing an event lifespan by connecting the at least a first temporal data point with the at least a second temporal data point; and determining the at least a maintenance operation for the at least an event as a function of the event lifespan.

16. The method of claim 10, wherein determining the at least a maintenance operation comprises:

validating the at least an event against the plurality of events, wherein validating the at least an event comprises:

locating an event disagreement associated with the at least an event within the event listing; and determining the at least a maintenance operation as a function of the location of the event disagreement.

17. The method of claim 10, wherein determining the at least a maintenance operation comprises:

determining an event placement for each event of the plurality of events within the event listing as a function of the entity data; and determining the at least a maintenance operation as a function of the event placement of each event of the plurality of events.

18. The method of claim 17, wherein maintaining the event listing comprises:

modifying the event listing by arranging the plurality of events according to the event placement of each event of plurality of events.

* * * * *